(12) United States Patent
List et al.

(10) Patent No.: US 12,534,484 B2
(45) Date of Patent: Jan. 27, 2026

(54) PROCESS FOR PREPARING DIMERIC PHOSPHAZENE DERIVED BRØNSTED ACIDS

(71) Applicant: Studiengesellschaft Kohle gGmbH, Muelheim (DE)

(72) Inventors: Benjamin List, Muelheim am der Ruhr (DE); Sebastian Armin Schwengers, Muelheim an der Ruhr (DE); Chandra Kanta De, Muelheim an der Ruhr (DE); Yihang Li, Muelheim an der Ruhr (DE)

(73) Assignee: Studiengesellschaft Kohle gGmbH, Muelheim (DE)

( * ) Notice: Subject to any disclaimer, the term of this patent is extended or adjusted under 35 U.S.C. 154(b) by 259 days.

(21) Appl. No.: 18/030,728

(22) PCT Filed: Sep. 28, 2021

(86) PCT No.: PCT/EP2021/076645
§ 371 (c)(1),
(2) Date: Apr. 6, 2023

(87) PCT Pub. No.: WO2022/173803
PCT Pub. Date: Apr. 14, 2022

(65) Prior Publication Data
US 2023/0406870 A1   Dec. 21, 2023

(30) Foreign Application Priority Data

Oct. 7, 2020  (EP) ..................................... 20200632
Mar. 16, 2021  (EP) ..................................... 21162986

(51) Int. Cl.
*C07F 9/6571*   (2006.01)

(52) U.S. Cl.
CPC .................................. *C07F 9/6571* (2013.01)

(58) Field of Classification Search
CPC ....................................................... C07F 9/6571
USPC ............................................................ 558/83
See application file for complete search history.

(56) References Cited

U.S. PATENT DOCUMENTS

| | | |
|---|---|---|
| 9,783,561 B2 | 10/2017 | List et al. |
| 11,084,834 B2 | 8/2021 | List et al. |
| 2018/0339999 A1* | 11/2018 | List .......................... C07F 9/44 |

FOREIGN PATENT DOCUMENTS

| | | |
|---|---|---|
| WO | 2013/104604 A1 | 7/2013 |
| WO | 2017/037141 A1 | 3/2017 |

OTHER PUBLICATIONS

William W.-L. Lam et al., "Preparation of Bi- and Tridentate Doubly P-Chiral Diphosphine Dioxide Ligands for Asymmetric Catalysis" Tetrahedron letters, Elsevier, Amsterdam, NL, vol. 37, No. 27, Jul. 1, 1996, pp. 4733-4736, XP004029005.

Marek Necas et al., "The synthesis and characterization of N-(diphenylthiophosphinyl)-P-phenyl-thiophosphonamidic acid phenyl ester and related compounds chiral at phosphorus", Inorganci Chemistry Communications, vol. 4, No. 1, Jan. 1, 2001, pp. 36-40, XP055774788.

* cited by examiner

*Primary Examiner* — Kristin A Vajda
(74) *Attorney, Agent, or Firm* — Norris McLaughlin, PA

(57) ABSTRACT

The present invention describes a new synthesis to chiral imidodiphosphoryl compounds, their salts, metal complexes as well as derivatives thereof. Said chiral imidodiphosphoryl compounds can be used as catalysts for Brønsted acid/Brønsted base or Lewis acid/Lewis base mediated transformations.

10 Claims, 10 Drawing Sheets

PROCESS FOR PREPARING DIMERIC PHOSPHAZENE DERIVED BRØNSTED ACIDS

Figure 1:
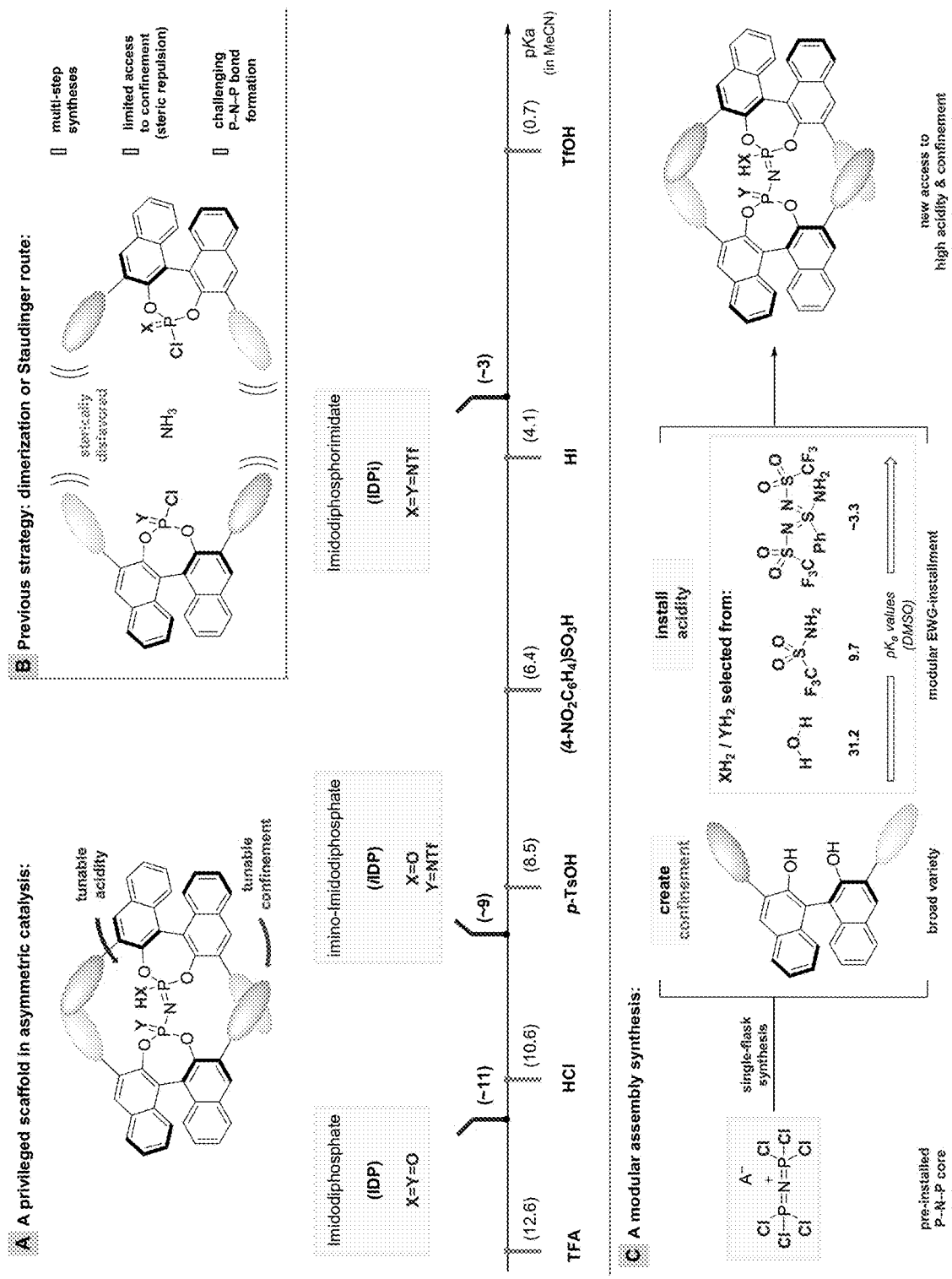

This application is a 371 of International Patent Application No. PCT/EP2021/076645, filed Sep. 28, 2021, which claims priority of European Patent Application No. 21162986.0, filed Mar. 16, 2021 and European Patent Application No. 20200632.6, filed Oct. 17, 2020, the disclosures of which patent applications are hereby incorporated herein by reference.

The present invention describes a new synthesis to chiral imidodiphosphoryl compounds, their salts, metal complexes as well as derivatives thereof. Said chiral imidodiphosphoryl compounds can be used as catalysts for Brønsted acid/Brønsted base or Lewis acid/Lewis base mediated transformations.

Asymmetric counteranion directed catalysis (ACDC) (*Angew. Chem. Int. Ed.* 2013, 52, 518-533) emerged as a powerful tool in the field of asymmetric catalysis. Initially, BINOL derived phosphoric acids (*Angew. Chem. Int. Ed.* 2004, 43, 1566-1568) were found to induce asymmetry in chemical transformations possessing charged intermediates, directed from the chiral counter anion. However, the 3,3'-substituents on BINOL radiate away from the active center, thus narrowing the possibilities of creating a suitable chiral microenvironment to catalyze reactions of a broad range of simple and unbiased substrates with high stereoselectivities. Therefore, a highly confined Brønsted acid based on a $C_2$-symmetric imidodisphoric acid motif—with an enzyme like chiral environment—has been introduced by the List group and successfully utilized in the context of ACDC (*Nature* 2012, 483, 315-319). Replacing the Lewis-basic oxygen atoms with electron withdrawing substituents like =NSO$_2$CF$_3$ (=NTf) groups led to the discovery of highly acidic BINOL derived $C_2$-symmetric imidodiphosphorimidates (IDPi) (*Angew. Chem. Int. Ed.* 2016, 55, 13200-13203) and imino-imidodisphorimidates (iIDP) (*J. Am. Chem. Soc.* 2016, 138, 10822-10825) which found applications in numerous, thus far inaccessible asymmetric chemical transformations accomplishing excellent stereoinduction (*Angew. Chem. Int. Ed.* 2019, 58, 12761-12777).

In the prior patent art, some imidodiphosphoryl compounds have been considered as chiral Brønsted acid catalysts or chiral Lewis acid catalysts for some reactions, in particular for the activation of ketones, aldehydes, alkenes, imines, enol ethers, ethers, alkynes, and acetals.

A novel C2-symmetric imidodiphosphate (IDP) derived Brønsted acid, enabling catalytic and highly stereoselective transformations of smaller and constitutionally unbiased substrates, has been disclosed in patent WO 2013/104604 A1

Selected Examples

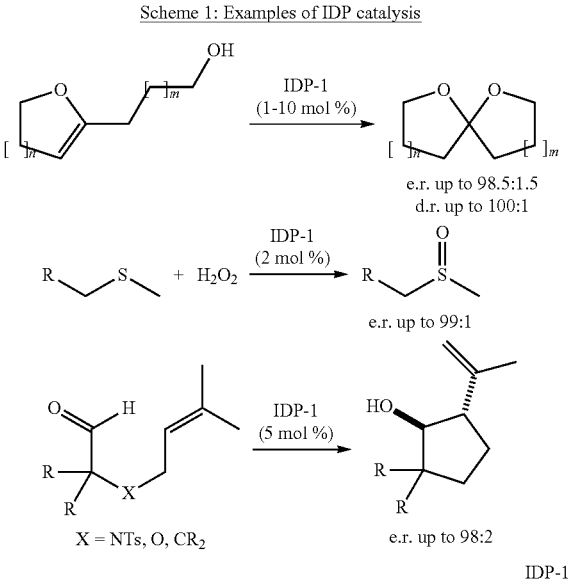

Scheme 1: Examples of IDP catalysis

To overcome the existing barriers regarding reactivity (acidity), Lewis basic oxygen atoms of the IDP phosphazene core have been replaced with more electron withdrawing substituents like sulfonyl amide substituents, which gave access to new catalyst motifs, namely iIDP and IDPi. A patent application concerning IDPi and iIDP catalysis has been filed (WO 2017/037141 A1).

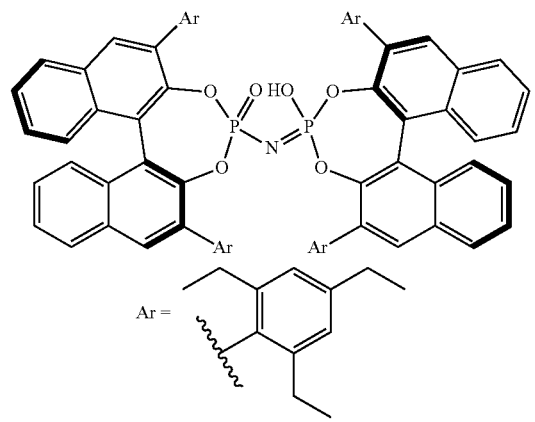

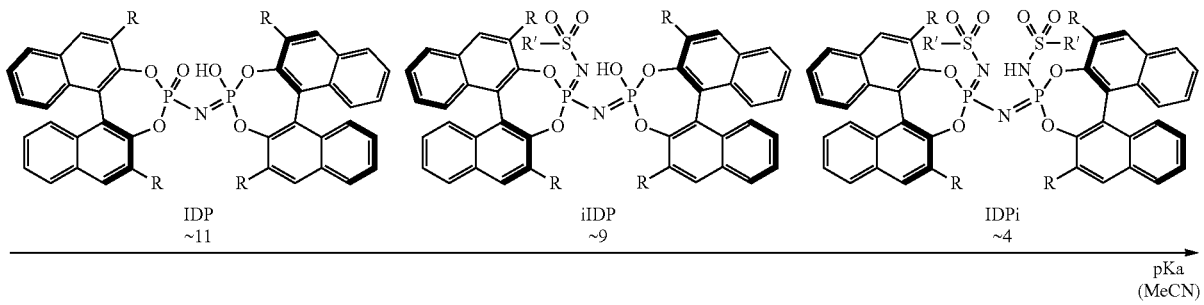

Scheme 2: Increasing Catalytic Reactivity with Increasing pKa

The high and tuneable acidity in combination with modular structural confinement has opened doors to unprecedented transformations in asymmetric Brønsted acid catalysis. Furthermore, the increased acidity allowed the utilization of IDPis as pre-catalysts for silylium based Lewis acid catalysis, representing a complementary activation mode in asymmetric organocatalysis. Pioneering contribution and novel milestone reactions, such as the first organocatalytic olefin activation, the selective mono-aldolization of acetaldehyde surrogates or a widely applicable Prins cyclization were recently realized. Furthermore, a notable development in organocatalysis with up to sub-ppm level of catalyst loadings for challenging C—C bond forming reactions was recently achieved. The mentioned examples illustrate the immense potential of iIDP and IDPi catalysis, which have been achieved in only a short period of time—which previously remained elusive due to the reduced acidity of IDPs.

Methods for the synthesis of imidodiphosphates and imidodiphosphorimidates are disclosed in WO2013104604A1 and WO2017037141A1 and can be exemplified for IDPis by the following reaction scheme in which two or more monomeric species consisting of formula (A) and formula (B) are reacted with ammonia or any ammonia surrogate ($NWY_2$) to connect both monomeric species which can have the formula: $NH_3$, HMDS, or salts thereof,

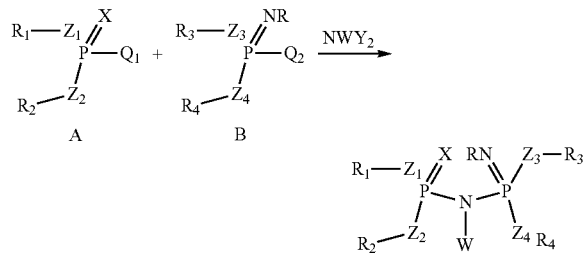

In cases however, in which both monomeric species possess sterically demanding substituents, this dimerization protocol has proven to be challenging and to furnish only moderate to low yields of the desired product.

Also, the synthesis of imidodiphosphorimidates, in which X and RN are different from each other rely on multi step procedures, in which both monomeric species need to be synthesized prior to the coupling procedure.

However, the general strategy to obtain the mentioned catalysts relied on a Staudinger approach or a dimerization protocol utilizing two monomeric BINOL-derived phosphoryl units in the presence of an ammonia surrogate. This dimerization protocol might be less promising in the presence of some sterically demanding BINOLs—for example, for some ortho, ortho-substituted 3,3'-aryl substituents—and therefore might diminish the options for creating a suitable chiral microenvironment. Furthermore, this protocol might require prolonged reaction time, additives and the obtained yields were highly dependent on the choice of the substituted BINOLs.

To overcome these limitations and to avoid utilizing the dimerization protocol, the inventors have developed a new method for preparing the desired imidodiphosphoryl products starting from a perchlorinated bisphosphazonium salt to develop a highly efficient and straightforward synthesis towards the dimeric phosphazene derived Brønsted acids as well as exploring the synthesis of chiral, highly confined phosphazene derived Brønsted bases.

Therefore, the present invention provides a new, modified synthesis to known and unknown chiral imidodiphosphoryl compounds, which are partially disclosed in said WO2013104604A1 and WO2017037141A1 to synthesize chiral or non-chiral imidodiphosphates, imino-imidodiphosphates and imidodiphosphorimidates, which can be utilized for asymmetric Brønsted acid/Lewis acid catalysis and/or for asymmetric Brønsted base/Lewis base catalysis.

In more detail, the inventors have considered to start from a building block, which already contains the desired dimeric phosphazene structure, containing leaving groups which building block comprises of the following formula (II)

$$Q_3P=N^+=PQ_3A^-  \quad (II)$$

The synthesis of said building block of formula (II) is disclosed in U.S. Pat. No. 3,357,805A and found widespread application for the synthesis of inorganic polymers. However, the use of said building block of formula (II) for the synthesis of chiral catalysts has not been reported.

Utilizing said building block of the general formula (II) as a platform molecule for the synthesis of imidodiphosphoryl compounds presents the following advantages:
  a) The P—N—P-core is already pre-installed, therefore avoiding an inefficient dimerization process and thus overcoming the limitations of steric repulsion.
  b) The Intermediate is readily functionalizable with suitable nucleophiles, selected from electron withdrawing or electron donating groups
  c) All mentioned imidodiphosphoryl compounds are accessible from the same intermediate.
  d) Only a single flask operation, which is scalable and furnishes the desired imidodiphosphoryl product within short reaction times, high yields and a single product isolation step is required Thus, the present invention provides a more efficient synthesis towards a broad range of chiral imidodiphosphoryl compound such as chiral imidodiphosphates (IDP), imino-imidodiphosphates (iIDP) and imidodiphosphorimidates (IDPi) as well as derivatives or precursors thereof. Furthermore, a new class of chiral Brønsted base is accessible following this new protocol, which are part of the invention and can be generalized in the scheme down below.

In more detail, the present invention refers to a process for preparing a chiral imidodiphosphoryl compound of formula (I) including its tautomeric and ionic forms:

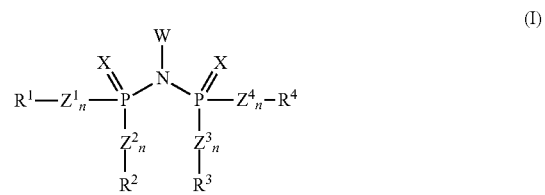

wherein in formula (I):
  X is the same or different on each P and represents O, S, Se, $CR^C_2$ or $NR^C$, preferably O or $NR^C$,
  $Z^1$ to $Z^4$ are, independently from each other, the same or different and each represents O, S, Se or $NR^C$, preferably O or $NR^C$,
  each n is, independently from each other, the same or different and stands for 0 or preferably 1,
  W is selected from hydrogen, halogen, a metal selected from Li, Na, K, Rb, Cs, Be, Mg, Ca, Sr, Ba Sc, Ti, V, Cr, Mn, Fe, Co, Ni, Cu, Zn, Y, Zr, Mo, Ru, Rh, Pd, Ag, Cd, W, Re, Os, Ir, Pt, Au, Hg, Al, Ga, In, Ge, Sn, Pb, As, Sb, Bi, Se, Te, La, Sm, Eu, Yb, U or a cationic organic group, a substituted borane —BR$^I$R$^{II}$R$^{III}$ or a substituted silicon —SiR$^I$R$^{II}$I$^{III}$, wherein R$^I$, R$^{II}$ and R$^{III}$ may be same or different and each stands for hydrogen, halogen, an optionally —O— bonded $C_1$ to $C_{20}$ straight chain, branched chain or cyclic aliphatic hydrocarbon, optionally having one or more unsaturated bonds or one or more hetero atoms in the chain, a $C_5$ to $C_{18}$ heteroaromatic hydrocarbon, a $C_6$ to $C_{18}$ aromatic hydrocarbon or partially arene-hydrogenated forms thereof, each hydrocarbon optionally being substituted by one or more groups selected from $C_1$ to $C_{20}$ straight chain, branched chain or cyclic aliphatic hydrocarbons, or one or more heterosubstituents, W being preferably selected from hydrogen and the substituted silicon —SiR$^I$R$^{II}$I$^{III}$, wherein R$^I$, R$^{II}$ and R$^{III}$ are as defined before, $R^1$, $R^2$, $R^3$ and $R^4$ are, independently from each other, the same or different and each represents an aliphatic hydrocarbon group, heteroaliphatic hydrocarbon group, aromatic hydrocarbon group, heteroaromatic hydrocarbon group, and, for n=0, F, Cl, Br, I, CN, OTf, OMs, OTs, or any other pseudohalogenide with leaving group properties, whereby $R^1$ may be forming a bond with any one of $R^2$, $R^3$ or $R^4$ and the other two of $R^2$, $R^3$ or $R^4$ may be forming a bond with each other, or whereby any of $R^1$, $R^2$, $R^3$, $R^4$, $X^1$ and $X^2$ may be forming a bond with each other, when $R^1$, $R^2$, $R^3$ and $R^4$ each represent an aliphatic hydrocarbon group, heteroaliphatic hydrocarbon group, aromatic hydrocarbon group, heteroaromatic hydrocarbon group;

$R^C$ represents, independently from each other, an aliphatic hydrocarbon group, heteroaliphatic hydrocarbon group, aromatic hydrocarbon group, an heteroaromatic hydrocarbon group, or $R^{N-}$;

with the proviso that at least one of $R^1$, $R^2$, $R^3$, $R^4$ or $R^C$ represents a hydrocarbon group as defined before, each hydrocarbon group optionally being further substituted by one or more heterosubstituents, aliphatic hydrocarbon group, heteroaliphatic hydrocarbon group, aromatic hydrocarbon group or heteroaromatic hydrocarbon group, wherein $R^N$ is an electron withdrawing or electron donating group, being the same or different on each position and being selected from:

i. -alkyl, —CO-alkyl, —(CO)—O-alkyl, sulfinyl alkyl, sulfonyl alkyl, sulfonyl iminoalkyl, sulfonyl bisiminoalkyl, phosphinyl dialkyl, phosphonyl alkyl, alkyl phosphorane, N,N'-alkylimidazolidin-2-iminyl wherein alkyl is a $C_1$ to $C_{20}$ straight chain, branched chain or cyclic aliphatic hydrocarbon, optionally having at least one substituent selected from halogen, preferably F and/or Cl, cyano, nitro, imino =NH, substituted imino =NR$^C$, amino —NH$_2$, or substituted amino —NHR$^C$, —NR$^C_2$ wherein R$^C$ represents, independently from each other, an aliphatic hydrocarbon group, a heteroaliphatic hydrocarbon group, an aromatic hydrocarbon group, or an heteroaromatic hydrocarbon group;

ii. -aryl, —CO-aryl, —(CO)—O-aryl, sulfinyl aryl, sulfonyl aryl, sulfonyl iminoaryl, sulfonyl iminosulfonylaryl, sulfonyl bisiminoaryl, phosphinyl diaryl, phosphinyl alkylaryl, phosphinyl aryl, aryl phosphoranes, aryl alkyl phosphoranes, N,N'-arylimidazolidin-2-iminyl, N-aryl-N'-alkylimidazolidin-2-iminyl wherein aryl is a $C_6$ to $C_{18}$ aromatic hydrocarbon, optionally having at least one substituent selected from halogen, preferably F and/or Cl, a $C_1$ to $C_6$ aliphatic hydrocarbon, optionally having at least one substituent selected from halogen, preferably F and/or Cl, cyano, nitro, imino =NH, substituted imino =NR$^C$, amino —NH$_2$ or substituted amino —NHR$^C$, —NR$^C_2$ wherein R$^C$ represents, independently from each other, an aliphatic hydrocarbon group, a heteroaliphatic hydrocarbon group, an aromatic hydrocarbon group, or an heteroaromatic hydrocarbon group;

iii. -heteroaryl, —CO-heteroaryl, —(CO)—O-heteroaryl, sulfinyl heteroaryl, sulfonyl heteroaryl, —(P=O)-di-heteroaryl, phosphinyl diheteroaryl, phosphinyl arylheteroaryl, phosphinyl heteroaryl alkyl, phosphonyl heteroaryl, heteroaryl phosphoranes, heteroaryl aryl phosphoranes, heteroaryl aryl alkyl phosphoranes, N,N'-heteroarylimidazolidin-2-iminyl, N-heteroaryl-N'-alkylimidazolidin-2-iminyl, N-heteroaryl-N'-arylimidazolidin-2-iminyl wherein heteroaryl is a $C_2$ to $C_{18}$ heteroaromatic hydrocarbon, optionally having at least one substituent selected from halogen, preferably F and/or Cl, a $C_1$ to $C_6$ aliphatic hydrocarbon, optionally having at least one substituent selected from halogen, preferably F and/or Cl, cyano, nitro, imino =NH, substituted imino =NR$^C$, amino —NH$_2$, or substituted amino —NHR$^C$, NR$^C_2$ wherein R$^C$ represents, independently from each other, an aliphatic hydrocarbon group, a heteroaliphatic hydrocarbon group, an aromatic hydrocarbon group, or an heteroaromatic hydrocarbon group whereby for those groups of i.), ii.) and iii.) having at least one C=O, S=O or P=O moiety, =O may be replaced by an imino group =N—R', and/or for those groups of i.), ii.) and iii.), having at least one C—OR, S—OR or P—OR moiety, —OR may be replaced by an amino group —NR'R", wherein R' and R" independently from each other represent an aliphatic hydrocarbon group, a heteroaliphatic hydrocarbon group, an aromatic hydrocarbon group, or an heteroaromatic hydrocarbon group, said process comprising the steps of reacting, in at least one reaction step, a bisphosphazene compound of formula (II):

$$Q_3P=N^+=PQ_3A^- \qquad (II)$$

wherein in formula (II):
each Q is, independently from each other, the same or different, and represents F, Cl, Br, I, CN, OTf, OMs, OTs, or any other pseudohalogenide with leaving group properties, and A$^-$ represents a halogenide or a weakly coordinating anion, with one to six nucleophilic groups being present on one to six, optionally chiral, compounds:
wherein one or two nucleophilic groups X$^W$ which can be the same or different from each other, are present on one to two optionally chiral bivalent compounds of formula (III) X$^W$W$_2$, wherein X$^W$ has the meaning of any of O, S, Se, CR$^C_2$ or NR$^C$; wherein R$^C$ has the meaning as defined above; preferably O or NR$^C$, and W has the meaning as defined above, preferably H, wherein up to four nucleophilic groups $Z^W$, which can be the same or different from each other and are present on one to four optionally chiral monovalent compounds of formula (IV) $R^C Z^W_n W$, wherein $R^C$ has the meaning as defined above, $Z^W$ is the same or different on each compound and has the meaning of any of $Z^1$ to $Z^4$, and W and n have the meanings as defined above, wherein: at least one nucleophilic group $X^W$ being present on one to two optionally chiral bivalent compounds of formula (III) $X^W W_2$, wherein $X^W$ has the meaning of any of $CR^C_2$ or $NR^C$; wherein $R^C$ has the meaning as defined above, or at least one, preferably at least two nucleophilic groups $Z^W$ being present on one to four optionally chiral monovalent compounds of formula (IV) $R^C Z^W_n W$, wherein $R^C$, $Z^W$, W and n have the meanings as defined above, is reacted with the compound of formula (II), with the proviso that, in formula (I), at least one of $R^1$ to $R^4$ is chiral, or at least two of $R^1$ to $R^4$ form a chiral group, or at least one P or at least one S is chiral.

As defined above for the inventive process, at least one Q substituent on the bisphosphazene compound of formula (II) is reacted in said at least one reaction step with a nucleophilic group being present on the bivalent compound of formula (III) $X^W W_2$ or on the monovalent compound of formula (IV) $R^C Z^W_n W$ resulting in a first substitution of the Q substituent on P. Depending on the reaction partner, either a X=P group or a $R—Z_n—P$ group is formed on the bisphosphazene structure. If desired, further Q substituents can be substituted by replaced by a nucleophilic group being present on the bivalent compound or on the monovalent compound, depending on the molar ratios up to a complete substitution of all Q substituents.

The reaction is not critical and can be carried out under moderate conditions, e.g. under ambient temperature and atmospheric pressure, in common polar and apolar, organic solvents, such as pyridine, toluene, DMF, THF, DCM, $CHCl_3$, preferably in toluene or pyridine if desired, under an inert atmosphere and, if desired, in the presence of the reaction partners, as a one-pot-synthesis or multi-step synthesis leading to the desired compound.

In the context of the invention, an aliphatic hydrocarbon group generally stands for a $C_1$ to $C_{50}$ hydrocarbon group, preferably a $C_1$ to $C_{20}$ hydrocarbon group or a $C_1$ to $C_6$ hydrocarbon group, which may be straight chain, branched or cyclic, a heteroaliphatic hydrocarbon group generally stands for a $C_1$ to $C_{20}$ carbon atoms group with oxygen or nitrogen in the chain, an aromatic hydrocarbon group stands for a $C_6$ to $C_{22}$ carbon atoms aromatic system optionally including aliphatic hydrocarbon group substituents with one to six carbon atoms, and a heteroaromatic hydrocarbon group stands for a $C_5$ to $C_{18}$ carbon atoms heteroaromatic system preferably with oxygen and/or nitrogen in the heteroaromatic system optionally including aliphatic hydrocarbon group substituents with one to six carbon atoms. Each of said hydrocarbons may be substituted by one or more heterosubstituents.

As a nucleophilic bivalent group $X^W$ in the optionally chiral bivalent compound of formula (III) $XW_2$, any of O, S, Se, $CR^C_2$ or $NR^C$, wherein $R^C$ has the meaning as defined above, is bound to two W having the meaning as defined above and can, in a nucleophilic attack, replace one Q on the compound (II) and form the X=P double bond in the next step. If desired and depending on the reaction conditions, a second nucleophilic attack of a second optionally chiral bivalent compound of formula (III) $XW_2$ leads to replacing one Q on the other P of compound (II) and, in a second step, to forming a second X=P double bond.

The one or two nucleophilic bivalent groups $X^W$ are preferably present on two or on one optionally chiral bivalent compound(s) of formula (III) $X^W W_2$ wherein $X^W$ has the meaning of any of $CR^C_2$ or $NR^C$, wherein $R^C$ and W have the meaning as defined above. In the case of two nucleophilic bivalent groups $X^W$ being present on one optionally chiral bivalent compound of formula (III) $X^W W_2$, the $X^W$ groups are forming a bond with each other. Preferably, the optionally chiral bivalent compound of formula (III) $X^W W_2$ is represented by $R^C—NH_2$ or $R^N—NH_2$ or their corresponding salts.

As a nucleophilic monovalent group $Z^W$ in the optionally chiral monovalent compound of formula (IV) $R^C Z_n W$, wherein $R^C$ has the meaning as defined above, any of O, S, Se, or $NR^N$ is bound to one W having the meaning as defined above and can, in a nucleophilic attack, replace one Q on the compound (II) and form the $Z^W—P$ bond. If desired and depending on the reaction conditions, a second, third and fourth nucleophilic attack leads to replacing step by step one Q also on the other P of compound (II) and to forming further $Z^W—P$ bond(s) in the next step(s).

The nucleophilic monovalent group(s) $Z^W$ are preferably present as two groups on one optionally chiral monovalent compound of formula (IV) $R^C Z^W_n W$, wherein $R^C$ has the meaning as defined above, $Z^W$ is the same or different on each compound and has the meaning of any of $Z^1$ to $Z^4$; and W and n have the meanings as defined above.

The nucleophilic substitution reaction of any Q of the compound of formula (II) can be carried out step by step after addition of the respective reaction partner(s) or simultaneously in a one pot synthesis.

Preferably, said one optionally chiral compound of formula (IV), which may be the same or different, is represented by a structural unit of formula (V):

(V)

In the structural unit of formula (V), $R^1$ to $R^4$, $Z^1$ to $Z^4$ and W have the meaning as defined above.

In a preferred embodiment of the structural unit of formula (V), $R^1$ to $R^4$ have the meaning as defined above, $Z^1$ to $Z^4$ are represented, independently from each other, by O or N, W is hydrogen.

More preferably, said structural unit of formula (V) is the same or different and is represented by BINOL, VANOL, VAPOL, TADDOL, SPINOL, or comprises, as corresponding to $R^{1,3}—R^{2,4}$, 1,1'binaphthyl, 8H-1,1-binaphthyl, biphenyl, 3,3'-(diphenyl)-2,2'-binaphthyl, biphenyl, 2,2'-diphenyl-3,3'-biphenanthrenyl, 1,1'-bianthracenyl, 1,1'-biphenanthryl or partially arene-hydrogenated forms thereof, 2,2-dimethyl-1,3-dioxolanyl, a $C_2$ to $C_{18}$ alkyl chain, spirobiindanyl, tetrahydrospirobinaphthalenyl, paracyclophanyl, metallocenyl, wherein $Z^1$ to $Z^4$ are represented, independently from each other, by O or N, W is hydrogen.

As stated above, the perhalogenated phosphazene is represented by the formula (II), in which Q represents any halogen (F, Cl, Br, I) or a leaving group having pseudohalogen capabilities (OTf, OMs, OTs, CN, —OCN, —NCO —SCN, —NCS). The corresponding counter anion $A^-$ can be any halogenide or weakly coordinating anion as, for example, $F^-$, $Cl^-$, $Br^-$, $I^-$, $BF_4^-$, $BCl_4^-$, $BBr_4^-$, $B(CN)_4^-$, $SbF_6^-$, $SbCl_6^-$, $PF_6^-$, $PCl_6^-$, $PBr_6^-$ and is not limited as long as it does not negatively influence the reaction.

According to the invention, a leaving group having pseudohalogen capabilities is meant to be a polyatomic analogue of halogens, whose chemistry, resembling that of the true halogens, allows them to substitute for halogens in several classes of chemical compounds.

The present invention covers several embodiments of the inventive process depending on the number of the nucleophilic groups and the order of the reaction steps of the nucleophilic groups with the perhalogenated phosphazene. Thus, the following embodiments of the invention are listed for exemplary purposes.

In one embodiment of the inventive process, a chiral imidodiphosphoryl compound of formula (I) as defined above is prepared, wherein in a first reaction step, one nucleophilic group $X^W$ which is present on one optionally chiral compound of formula (III) $X^W W_2$ or two nucleophilic groups $X^W$ which are present on one or on two optionally chiral compounds of formula (III) $X^W W_2$, respectively, are reacted with a bisphosphazene compound of formula (II), and, in a second step, the reaction product obtained in the first reaction step is optionally reacted:
- with a quencher for removing any remaining Q group, or preferably
- with up to four nucleophilic groups which can be the same or different from each other and which are present on one to four optionally chiral compounds of formula (IV) $R^C Z^W_n W$, wherein $R^C$ has the meaning as defined above, $Z^W$ is the same or different on each compound and has the meaning of any of $Z^1$ to $Z^4$, and which are reacted with the reaction product of the first step, whereby the reaction product obtained in the second step is optionally reacted with a quencher for removing any remaining Q group, wherein $X^W$, W, $R^1$, $R^2$, $R^3$, $R^4$, $R^N$ and n have the meaning as defined in claim 1.

Concerning the number of nucleophilic groups $X^W$, one nucleophilic group $X^W$ which is present on one optionally chiral compound of formula (III) $X^W W_2$ or two nucleophilic groups $X^W$ which are present on one or on two optionally chiral compounds of formula (III) $X^W W_2$, respectively, are reacted with a bisphosphazene compound of formula (II) and one or two P=X groups are formed as:

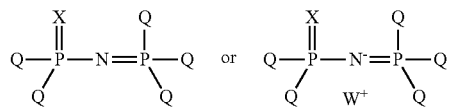

In the next step(s), one to four Q may be further replaced, each by reacting with a quencher such as water, dimethylformamide (DMF), any water reaction analogon such as siloxanes, hydroxide salts, alkali metal oxides, metal oxides or preferably by reacting in a nucleophilic attack by one to four nucleophilic groups $Z^W$, being be the same or different from each other and being present on up to four optionally chiral compounds of formula (IV) $R^C Z^W_n W$, preferably two nucleophilic groups $Z^W$ on one or two optionally chiral compounds of formula (IV) $R^C Z^W_n W$, optionally followed by reacting any remaining Q in a nucleophilic attack with a quencher such as water to obtain an iIDP compound.

Alternatively, one to four nucleophilic groups $Z^W$, which can be the same or different from each other and which are present on one, preferably two, to four optionally chiral compounds of the formula (IV) $R^C Z^W_n W$ are reacted with a bisphosphazene compound of formula (II) leading in a first step to a compound:

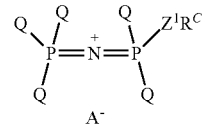

and in a further step to:

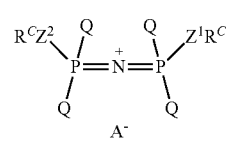

up to a final compound:

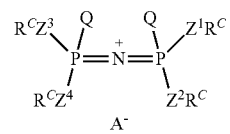

In said reaction pathway, the $R^C$ groups on either P atom are preferably bridged, as for example, as a biphenyl or binaphthyl-like structure. Said final compound

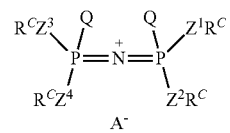

can be further reacted with a quencher such water to obtain an IDP compound, or alternatively, with one or two nucleophilic groups $X^W$, one nucleophilic group $X^W$ being present on one optionally chiral compound of formula (III) $X^W W_2$ or two nucleophilic groups $X^W$ being which are present on one or on two optionally chiral compounds of formula (III) $X^W W_2$ to obtain an iIDP compound or an IDPI compound.

In a preferred embodiment of the inventive process for preparing a chiral imidodiphosphoryl compound of formula (I), four nucleophilic groups $Z^W$, which can be the same or different from each other and which are present on two to four optionally chiral compounds of formula (IV) $R^C Z^W_n W$, wherein $R^C$ has the meaning as defined above and n is 0 or 1, are reacted, in a first reaction step, with the bisphosphazene compound of formula (II), and, in a second reaction step, the reaction product obtained in the first step is optionally reacted with a quencher for removing the remaining Q groups, wherein $X^W$, $Z^W$, W, $R^1$, $R^2$, $R^3$, $R^4$, $R^C$, $R^N$ and n have the meaning as defined above.

In another embodiment of the inventive process, two nucleophilic groups $X^W$ which are $CR^C_2$ or $NR^C$ and four nucleophilic groups $Z^W$ which can be the same or different from each other and which may be present on two to four optionally chiral compounds of formula (IV) $R^W Z^W_n W$, wherein $R^C$ has the meaning as above defined and n is 0 or 1, are present on one optionally chiral compound, are stepwise reacted with the bisphosphazene compound of formula (II), wherein $X^W$, $Z^W$, W, $R^1$, $R^2$, $R^3$, $R^4$, $R^C$, $R^N$ and n have the meaning as defined above. In this particular embodiment, the six nucleophilic groups being capable of reacting with the bisphosphazene compound of formula (II) are present on a single compound such as a aliphatic hydrocarbon chain or an aromatic hydrocarbon chain or combinations thereof, as for example, in a aliphatic hydrocarbon chain having four secondary amine groups and two primary amine groups, all amine groups being appropriately distanced in the chain to allow the respective substitution reactions with the halogens of the bisphosphazene compound of formula (II).

In a further embodiment of the inventive process, wherein four nucleophilic groups $Z^W$, which can be the same or different from each other and which are present on two optionally chiral compounds of formula (IV) $R^C Z^W{}_n W$, wherein $R^C$ has the meaning as defined above and n is 0 or 1, are reacted with the bisphosphazene compound of formula (II), $$Q_3P=N^+=PQ_3 A^-  \quad (II)$$

wherein in formula (II):
each Q is, independently from each other, the same or different, and represents F, Cl, Br, I, CN, OTf, OMs, OTs, or any other pseudohalogenide with leaving group properties, and
wherein $A^-$ represents a halogenide or weakly coordinating anion, said two optionally chiral compounds of formula (IV) $R^C Z^W{}_n W$, which may be the same or different, are represented by a structural unit of formula (V):

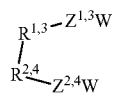

(V)

wherein $Z^W$, $Z^1$, $Z^2$, $Z^3$, $Z^4$, W which can be the same or different from each other, $R^1$, $R^2$, $R^3$, $R^4$, $R^C$, $R^N$ and n have the meaning as defined above. In said structural unit of formula (V), the hydrocarbon moieties $R^{1,2}$ and $R^{3,4}$ are bridged/bonded together, to form a hydrocarbon cycle. In said structural unit of formula (V), Z may be the same or different and is preferably a O or $NR^C$.

Said structural unit of formula (V) is the same or different and is preferably represented by BINOL, VANOL, VAPOL, TADDOL, SPINOL, or comprises 1,1'binaphthyl, 8H-1,1-binaphthyl, biphenyl, 3,3'-(diphenyl)-2,2'-binaphthyl, biphenyl, 2,2'-diphenyl-3,3'-biphenanthrenyl, 1,1'-bianthracenyl, 1,1'-biphenanthryl or partially arene-hydrogenated forms thereof, 2,2-dimethyl-1,3-dioxolanyl, a $C_2$ to $C_{18}$ alkyl chain, spirobiindanyl, tetrahydrospirobinaphthalenyl, paracyclophanyl, metallocenyl, being substituted by O or $NR^C$ as any of Z1 to Z4, and wherein each of the compounds before is optionally substituted by one or more substituents which may be same or different on each position and which is each selected from hydrogen, a heterosubstituent, a $C_1$ to $C_{20}$ aliphatic hydrocarbon, optionally having one or more unsaturated bonds, a $C_6$ to $C_{18}$ aromatic hydrocarbon or a $C_5$ to $C_{18}$ heteroaromatic hydrocarbon which hydrocarbons may be substituted by one or more heterosubstituents.

In a further embodiment of the inventive process, said structural unit of formula (V) is the same or different and is represented by formula (VI), the partially arene-hydrogenated forms thereof such as 8H-binol, or by formula (VII):

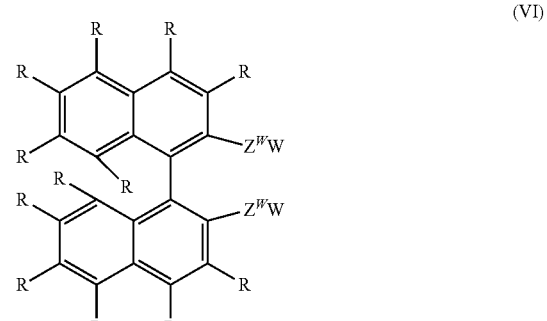

(VI)

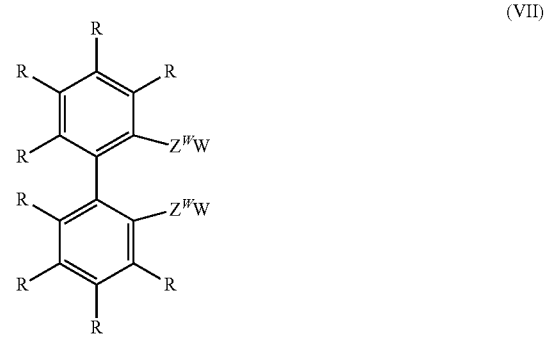

(VII)

wherein in said formulae (VI) and (VII), the substituent R may be same or different on each position and is each selected from hydrogen, a heterosubstituent, a $C_1$ to $C_{20}$ aliphatic hydrocarbon, optionally having one or more unsaturated bonds, a $C_6$ to $C_{18}$ aromatic hydrocarbon or a $C_5$ to $C_{18}$ heteroaromatic hydrocarbon which hydrocarbons may be substituted by one or more heterosubstituents, and two of which substituent R may form an aliphatic or aromatic ring system with each other and wherein $Z^W$ and W are as defined in claim 1.

Thus, one embodiment of the process of the present invention is directed to a process for preparing a chiral imidodiphosphoryl compound of formula (I) as defined above, wherein a compound which is represented by formula (VI), the partially arene-hydrogenated forms thereof or by formula (VII):

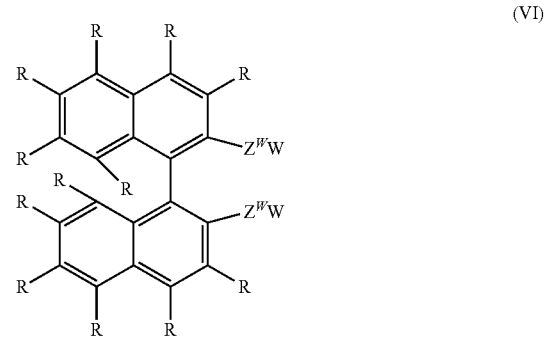

(VI)

-continued

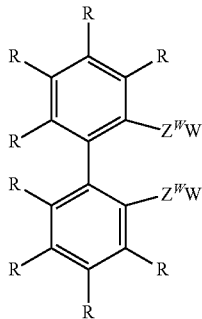

Figure 4:
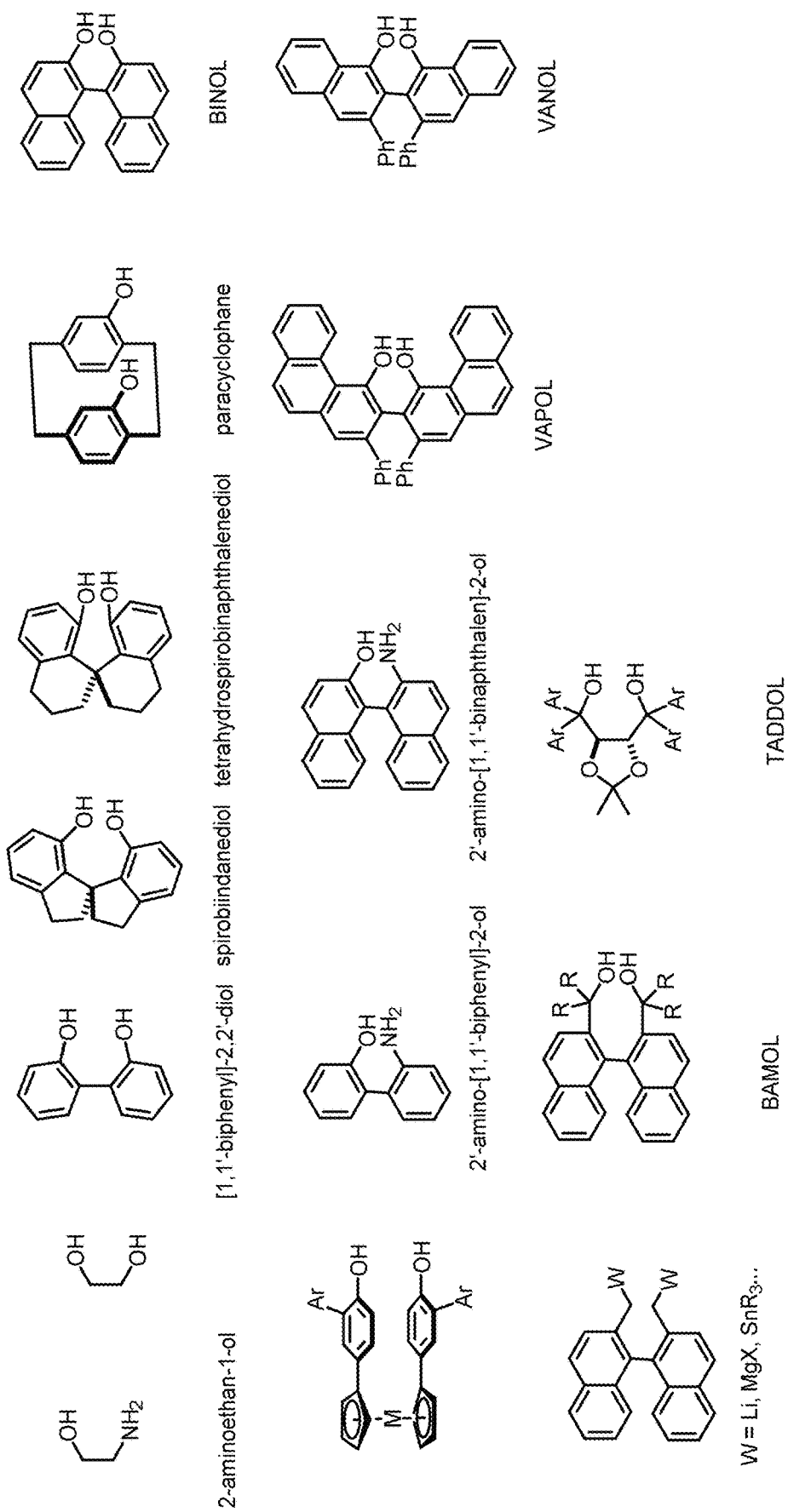

(VII)

wherein in said formulae (VI) and (VII), the substituent R may be same or different on each position and is each selected from hydrogen, a heterosubstituent, a $C_1$ to $C_{20}$ aliphatic hydrocarbon, optionally having one or more unsaturated bonds, a $C_6$ to $C_{18}$ aromatic hydrocarbon or a $C_5$ to $C_{18}$ heteroaromatic hydrocarbon which hydrocarbons may be substituted by one or more heterosubstituents, and two of which substituents R may form an aliphatic or aromatic ring system with each other and wherein $Z^W$ is, independently from each other, the same or different and each represents O or $NR^C$ wherein $R^C$ represents, independently from each other, an aliphatic hydrocarbon group, heteroaliphatic hydrocarbon group, aromatic hydrocarbon group, or an heteroaromatic hydrocarbon group, or $R^N$ as defined above and each W, independently from each other, represents hydrogen, halogen, a metal selected from Li, Na, K, Rb, Cs, Be, Mg, Ca, Sr, Ba Sc, Ti, V, Cr, Mn, Fe, Co, Ni, Cu, Zn, Y, Zr, Mo, Ru, Rh, Pd, Ag, Cd, W, Re, Os, Ir, Pt, Au, Hg, Al, Ga, In, Ge, Sn, Pb, As, Sb, Bi, Se, Te, La, Sm, Eu, Yb, U or a cationic organic group, a substituted borane —$BR'R''R'''$ or a substituted silicon —$SiR'R''I'''$ as defined in claim 1, preferably W being hydrogen, is reacted, optionally in a stoichiometric molar excess, optionally in at least a twofold stoichiometric molar excess, with a bisphosphazene compound of formula (II):

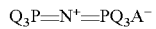 (II)

wherein in formula (II):
each Q is, independently from each other, the same or different, and represents F, Cl, Br, I, CN, OTf, OMs, OTs, or any other pseudohalogenide with leaving group properties, preferably a halogen such as Cl, and
wherein $A^-$ represents a halogenide or a weakly coordinating anion, and
the obtained reaction product is further reacted a) with water or b) with a compound having the formula $R^CNH_2$ wherein $R^C$ has the meaning of any of $R^1$ to $R^4$, whereby $R^1$, $R^2$, $R^3$ and $R^4$ each represent an aliphatic hydrocarbon group, heteroaliphatic hydrocarbon group, aromatic hydrocarbon group, or an heteroaromatic hydrocarbon group, or of $R^N$ as defined above, preferably the meaning of $R^N$, or the meaning of any of the compounds as represented in FIG. 4, and in the latter case b) with water or with another compound $R^CNH_2$, wherein $R^C$ has the meaning as defined above for the first reaction step. Thus, the inventive process may be used to prepare an IDP, an iIDP or IDPI structure or any intermediate structure, in which not every Q-group is replaced, in a convenient way.

It is also possible, to revert the order of steps and to let the bisphosphazene compound of formula (II) first react with one or two compounds of $R^CNH_2$ and then with a compound which is represented by formula (VI), the partially arene-hydrogenated forms thereof or by formula (VII).

Thus, the inventive process may lead in an efficient way to a compound as represented in any of the following formulae:

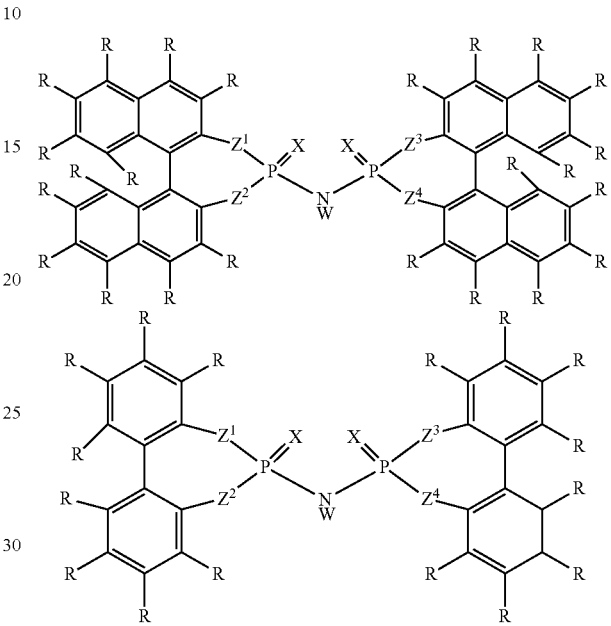

or partially arene hydrogenated forms wherein at least one aromatic core has been hydrogenat, wherein, in said formulae, the substituent R may be same or different on each position and is each selected from hydrogen, a heterosubstituent, a $C_1$ to $C_{20}$ aliphatic hydrocarbon, optionally having one or more unsaturated bonds, a $C_6$ to $C_{18}$ aromatic hydrocarbon or a $C_5$ to $C_{18}$ heteroaromatic hydrocarbon which hydrocarbons may be substituted by one or more heterosubstituents, and two of which substituents R may form an aliphatic or aromatic ring system with each other; $Z^1$ to $Z^4$ are, independently from each other, the same or different and each represents O or $NR^C$; X is the same or different on each P and represents O or $NR^C$, $R^C$ has the meaning as defined above, and W has the meaning as defined before.

As detailed above, the inventive process allows the preparation of a broad range of compounds which have been accessible in the prior art with difficulties and/or serious efforts only.

In the above schemes, the definitions are as follows:

$R^1$, $R^2$, $R^3$ and $R^4$ are further defined below and are generally, independently from each other, the same or different and are each an aliphatic, heteroaliphatic, aromatic or heteroaromatic hydrocarbon group as also defined above, each optionally being further substituted by one or more heterosubstituents, aliphatic, heteroaliphatic, aromatic or heteroaromatic hydrocarbon groups, whereby $R^1$ may be forming a ring system with any one of $R^2$, $R^3$ or $R^4$ and the other two of $R^2$, $R^3$ or $R^4$ may be forming a ring system with each other.

$Z^1$ to $Z^4$ are, independently from each other, the same or different and represent 0, S, Se or $NR^C$, preferably O or $NR^C$.

W is a substituent being capable of forming a bond with the imidodiphosphoryl moiety, and is further defined below.

$R^N$ represents an electron withdrawing or electron donating group, being the same or different on each position and being selected from:

i. -alkyl, —CO-alkyl, —(CO)—O-alkyl, sulfinyl alkyl, sulfonyl alkyl, sulfonyl iminoalkyl, sulfonyl bisiminoalkyl, phosphinyl dialkyl, phosphonyl alkyl, alkyl phosphorane, N,N'-alkylimidazolidin-2-iminyl wherein alkyl is a $C_1$ to $C_{20}$ straight chain, branched chain or cyclic aliphatic hydrocarbon, optionally having at least one substituent selected from halogen, preferably F and/or Cl, cyano, nitro, imino =NH, substituted imino =$NR^C$, amino —$NH_2$, or substituted amino —$NHR^C$, —$NR^C_2$ wherein $R^C$ represents, independently from each other, an aliphatic hydrocarbon group, a heteroaliphatic hydrocarbon group, an aromatic hydrocarbon group, or an heteroaromatic hydrocarbon group;

ii. -aryl, —CO-aryl, —(CO)—O-aryl, sulfinyl aryl, sulfonyl aryl, sulfonyl iminoaryl, sulfonyl iminosulfonylaryl, sulfonyl bisiminoaryl, phosphinyl diaryl, phosphinyl alkylaryl, phosphonyl aryl, aryl phosphoranes, aryl alkyl phosphoranes, N,N'-arylimidazolidin-2-iminyl, N-aryl-N'-alkylimidazolidin-2-iminyl wherein aryl is a $C_6$ to $C_{18}$ aromatic hydrocarbon, optionally having at least one substituent selected from halogen, preferably F and/or Cl, a $C_1$ to $C_6$ aliphatic hydrocarbon, optionally having at least one substituent selected from halogen, preferably F and/or Cl, cyano, nitro, imino =NH, substituted imino =$NR^C$, amino —$NH_2$ or substituted amino —$NHR^C$, —$NR^C_2$ wherein $R^C$ represents, independently from each other, an aliphatic hydrocarbon group, a heteroaliphatic hydrocarbon group, an aromatic hydrocarbon group, or an heteroaromatic hydrocarbon group;

iii. -heteroaryl, —CO-heteroaryl, —(CO)—O-heteroaryl, sulfinyl heteroaryl, sulfonyl heteroaryl, —(P=O)-diheteroaryl, phosphinyl diheteroaryl, phosphinyl arylheteroaryl, phosphinyl heteroaryl alkyl, phosphonyl heteroaryl, heteroaryl phosphoranes, heteroaryl aryl phosphoranes, heteroaryl aryl alkyl phosphoranes, N,N'-heteroarylimidazolidin-2-iminyl, N-heteroaryl-N'-alkylimidazolidin-2-iminyl, N-heteroaryl-N'-arylimidazolidin-2-iminyl wherein heteroaryl is a $C_2$ to $C_{18}$ heteroaromatic hydrocarbon, optionally having at least one substituent selected from halogen, preferably F and/or Cl, a $C_1$ to $C_6$ aliphatic hydrocarbon, optionally having at least one substituent selected from halogen, preferably F and/or Cl, cyano, nitro, imino =NH, substituted imino =$NR^C$, amino —$NH_2$, or substituted amino —$NHR^C$, $NR^C_2$ wherein $R^C$ represents, independently from each other, an aliphatic hydrocarbon group, a heteroaliphatic hydrocarbon group, an aromatic hydrocarbon group, or an heteroaromatic hydrocarbon group;

whereby for those groups of i.), ii.) and iii.) having at least one C=O, S=O or P=O moiety, =O may be replaced by an imino group =N—R', and/or for those groups of i.), ii.) and iii.), having at least one C—O—, S—O— or P—O— moiety, —O-moiety may be replaced by an amino group —NR'R", wherein R' and R", independently from each other, represent an aliphatic hydrocarbon group, a heteroaliphatic hydrocarbon group, an aromatic hydrocarbon group, or an heteroaromatic hydrocarbon group.

Thus, a $R^N$ group which contains oxygen atoms as =O or as —O— can be further modified, in which one or all oxygen atoms are replaced by another electron withdrawing group and which may be represented by R' and R" as follows:

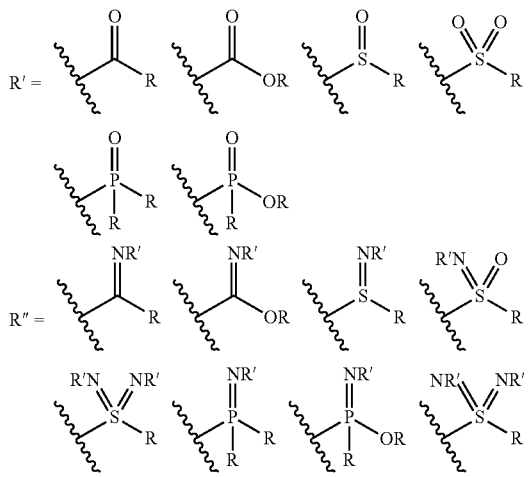

In case, in which two oxygen atoms are replaced by an electron withdrawing group, selected from the above mentioned examples, the electron withdrawing groups can be the same or different from each other. Further examples for $R^N$ are shown in FIG. 4.

Replacing Oxygen atoms with electron withdrawing substituents has been disclosed by Yagupolskii et. al. (*J. Chem. Soc. Perkin Trans.* 2, 2002, 1950-1955). However, the inventors found a more applicable and safer alternative to the synthesis of these higher homologues (R' and R") which are used in the inventive process as detailed above and below in the experimental part.

On the other hand however, the inventors also found the way for introducing an electron donating groups into the systems, in particular the aliphatic or aromatic hydrocarbons groups having electron donating substituents such as —O-alkyl, —O-aryl, —O-heteroaryl, amino groups in which the amino group is optionally further substituted by $R^C$ as defined above, imino groups in which the imino group is optionally further substituted by $R^C$ as defined above etc. as detailed above and below in the experimental part.

In the scope of the present application, the expression "imidodiphosphoryl compound" is to be understood to comprise derivatives thereof, wherein one or more of the oxygen atoms of the phosphoramidimidate moiety is replaced by S, Se, $NR^N$ as defined above as long as they are chiral and preferably enantiopure.

Definitions

In the following, it is to be understood that the above formula (I) as well as any other formula as used herein comprises any tautomeric form. In this respect, the tautomeric forms as well as polarized bonds $W^{\delta+}$—$N^{\delta-}$ are understood to be covered by said definitions.

In the scope of the present application, the expression "imidodiphosphoryl compound" is to be understood to comprise derivatives thereof, wherein one or more of the oxygen atoms of the imidodiphosphoryl moiety is replaced by S, Se, $NR^C$ as defined above, or wherein $R^C$ is directly attached to the imidodiphosphoryl moiety, as long as they are non-chiral or chiral and preferably enantiopure.

In the above formula (I) and the derived formulae below, it is to be understood that any tautomeric form of the inventive chiral imidodiphosphoryl compound as well as any charged form thereof including any anionic form is to be comprised by the representation of said formula. It is also to be understood that imidodiphosphoryl compound could possess inherent chirality even if all of the groups $R^1$ to $R^4$ or $R^N$ are achiral groups. Thus, chirality might also be present for the inventive compounds if P is substituted by four different substituents.

In the above formula (I), any of $R^1$ to $R^4$ is each and independently from each other selected from $C_1$ to $C_{20}$ straight chain, branched chain or cyclic aliphatic hydrocarbons, optionally having one or more unsaturated bonds such as $C_1$-$C_{20}$-alkyl, $C_2$-$C_{20}$-alkenyl or $C_2$-$C_{20}$-alkinyl, from $C_3$-$C_8$-heterocycloalkyl or from $C_6$ to $C_{20}$ aromatic hydrocarbons and partially arene-hydrogenated forms such as aryl, aryl-($C_1$-$C_6$)-alkyl, heteroaryl-($C_1$-$C_6$)-alkyl, each aliphatic or aromatic hydrocarbon optionally being substituted by one or more groups selected from $C_1$ to $C_{20}$ straight chain, branched chain or cyclic aliphatic hydrocarbons, from $C_6$ to $C_{20}$ aromatic hydrocarbons and partially arene-hydrogenated forms or from heterosubstituents.

$R^1$ and R 2 may also be forming a ring system together with P, $Z^1$ and $Z^2$, and independently, $R^3$ and $R^4$ may also be forming a ring system together with P, $Z^3$ and $Z^4$, respectively. Any of $R^1$ to $R^4$ may be chiral or may be containing at least one chirality center, or $R^1$ and $R^2$ and/or $R^3$ and $R^4$, respectively, may be forming a chiral group.

In the above formula (I), $R^1$ may also be forming a ring system with any one of $R^2$, $R^3$ or $R^4$ and the other two of $R^2$, $R^3$ or $R^4$ may be forming a ring system with each other. Thus, one ring system may be formed on one phosphoryl unit or may be linking one phosphoryl unit to the other phosphoryl unit on either side of the amide center moiety.

In the above formula (I), W is a substituent being capable of forming a bond with the imidodiphosphoryl moiety which may be a ionic or covalent bond which may also be polarized, and thus, W is selected from hydrogen, halogen, a metal such as Li, Na, K, Rb, Cs, Be, Mg, Ca, Sr, Ba Sc, Ti, V, Cr, Mn, Fe, Co, Ni, Cu, Zn, Y, Zr, Mo, Ru, Rh, Pd, Ag, Cd, W, Re, Os, Ir, Pt, Au, Hg, Al, Ga, In, Ge, Sn, Pb, As, Sb, Bi, Se, Te, La, Sm, Eu, Yb, U or a cationic organic group, a substituted borane —$BR^IR^{II}R^{III}$ or a substituted silicon —$SiR^IR^{II}I^{III}$, wherein $R^I$, $R^{II}$ and $R^{III}$ may be same or different and each stands for hydrogen, halogen, an optionally —O— bonded $C_1$ to $C_{20}$ straight chain, branched chain or cyclic aliphatic hydrocarbon, optionally having one or more unsaturated bonds or one or more hetero atoms in the chain, a $C_5$ to $C_{18}$ heteroaromatic hydrocarbon, a $C_6$ to $C_{18}$ aromatic hydrocarbon or partially arene-hydrogenated forms thereof, each hydrocarbon optionally being substituted by one or more groups selected from $C_1$ to $C_{20}$ straight chain, branched chain or cyclic aliphatic hydrocarbons, or one or more heterosubstituents, W being preferably selected from hydrogen and the substituted silicon —$SiR^IR^{II}I^{III}$, wherein $R^I$, $R^{II}$ and $R^{III}$ are defined before, W being hydrogen or the above indicated substituted silicon groups being advantageously used.

In Scheme 3, the possible cationic groups are exemplified.

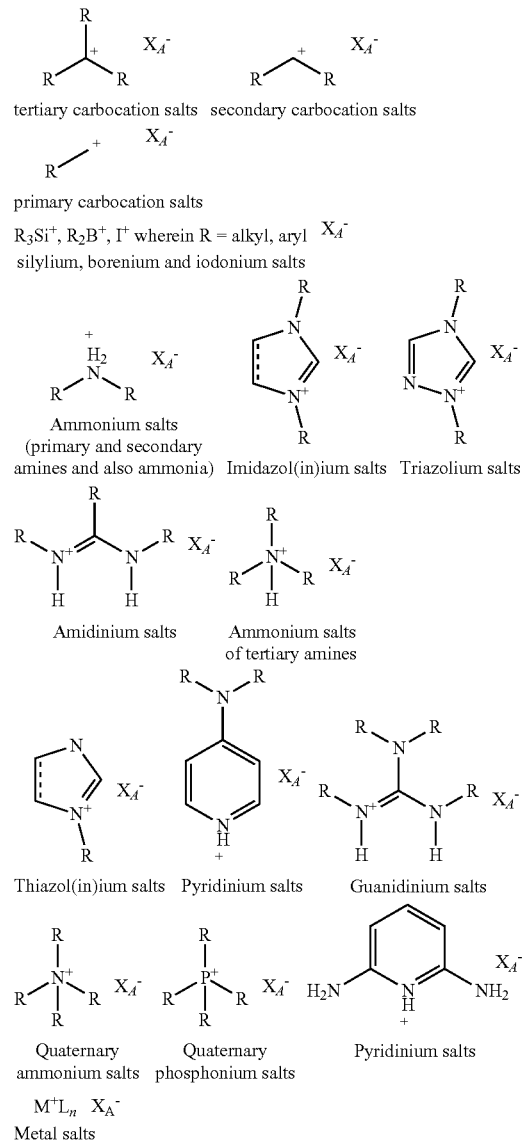

Scheme 3: Examples of possible cationic organic groupls $M^+X_A^-$ tertiary carbocation salts   secondary carbocation salts primary carbocation salts $R_3Si^+$, $R_2B^+$, $I^+$ wherein R = alkyl, aryl  $X_A^-$
silylium, borenium and iodonium salts Ammonium salts (primary and secondary amines and also ammonia)   Imidazol(in)ium salts   Triazolium salts Amidinium salts   Ammonium salts of tertiary amines Thiazol(in)ium salts   Pyridinium salts   Guanidinium salts Quaternary ammonium salts   Quaternary phosphonium salts   Pyridinium salts $M^+L_n$  $X_A^-$
Metal salts The expression "partially arene-hydrogenated forms thereof" is to be understood that in case that the aromatic structure comprises more than one aromatic cycle such as for naphthalene, at least one aromatic cycle, one aromatic cycle remaining, might be partially or fully hydrogenated.

The anionic form may be complemented by any cation for forming an ion pair.

In an embodiment of the above formula (I), $Z^1$ to $Z^4$ independently represent O, S, Se or $NR^C$, preferably O or $NR^C$, and X, $R^1$ to $R^4$, $R^C$, $R^N$ as well as W are as defined before. In such formulae (I) and (II), the structure might also comprise a five to ten-membered ring structure of ($R^1$, $R^2$, $Z^1$, $Z^2$ and —PX—) or ($R^3$, $R^4$, $Z^3$, $Z^4$ and —PNR$^N$—), respectively, wherein $R^1$ to $R^4$, $Z^1$ to $Z^4$, n, $R^C$, $R^N$, X and W are as defined above.

The following definitions apply to the individual groups R, $R^C$, $R^N$ and $R^1$ to $R^4$ equally as follows.

A heterosubstituent as defined according to the invention can be selected from OH, F, Cl, Br, I, CN, $NO_2$, I-$R^S_2$, NO, NCO, —NCS, —SCN, $SO_3H$, a monohalogenomethyl group, a dihalogenomethyl group, a trihalogenomethyl group, $CF(CF_3)_2$, $SF_5$, aliphatic, aromatic, heteroarmatic, primary, secondary, tertiary amine or ammonium bound through N atom, —O-alkyl (alkoxy), —O-aryl, —O-heteroaryl —O—$SiR^S_3$, —S—S—$R^S$, —S—$R^S$, —S(O)—$R^S$, —S(O)$_2$—$R^S$, —COOH, —CO$_2$—$R^S$, —$BR^S_2$, —$PPR^S_2$, —$OPR^S_2$, amide, bound through C or N atom, formyl group, —C(O)—$R^S$, —COOM, where M is a metal such as Li, Na, K, Cs, Ag. $R^S$ may be, independently from each other, the same or different and is each an aliphatic, heteroaliphatic, aromatic or heteroaromatic group, each optionally being further substituted by one or more heterosubstituents, aliphatic, heteroaliphatic, aromatic or heteroaromatic groups; and/or optionally bridged by an —O— atom, represents a halogenide Aliphatic hydrocarbons including alkyl, alkenyl and alkinyl may comprise straight-chain, branched and cyclic hydrocarbons.

Heteroaliphatic is a hydrocarbon including alkyl, alkenyl and alkinyl which may comprise straight-chain, branched and cyclic hydrocarbons with one or more carbon atoms substituted with a heteroatom.

In more detail, $C_1$-$C_{20}$-alkyl can be straight chain or branched and has 1, 2, 3, 4, 5, 6, 7, 8, 9, 10, 11, 12, 13, 14, 15, 16, 17, 18, 19 or 20 carbon atoms. Alkyl might be $C_1$-$C_6$-alkyl, in particular methyl, ethyl, propyl, isopropyl, butyl, isobutyl, sec-butyl or tert-butyl, likewise pentyl, 1-, 2- or 3-methylpropyl, 1,1-, 1,2- or 2,2-dimethylpropyl, 1-ethylpropyl, hexyl, 1-, 2-, 3- or 4-methylpentyl, 1,1-, 1,2-, 1,3-, 2,2-, 2,3- or 3,3-dimethylbutyl, 1- or 2-ethylbutyl, 1-ethyl-1-methylpropyl, 1-ethyl-2-methylpropyl, 1,1,2- or 1,2,2-trimethylpropyl. Substituted alkyl groups are trifluoromethyl, pentafluoroethyl and 1,1,1-trifluoroethyl.

Cycloalkyl might be cyclopropyl, cyclobutyl, cyclopentyl, cyclohexyl or cycloheptyl. Alkenyl might be $C_2$-$C_{20}$ alkenyl. Alkinyl might be $C_2$-$C_{20}$ alkinyl.

Said unsaturated alkenyl- or alkinyl groups can be used for linking the inventive compounds to a carrier such as a polymer to serve for an immobilized catalyst.

Halogen is F, Cl, Br or I.

Alkoxy is preferably $C_2$-$C_{10}$ alkoxy such as methoxy, ethoxy, propoxy, tert-butoxy, butoxy, pentoxy, etc. and isomers thereof.

$C_3$-$C_8$-Heterocycloalkyl having one or more heteroatoms selected from among N, O and S is preferably 2,3-dihydro-2-, -3-, -4- or -5-furyl, 2,5-dihydro-2-, -3-, -4- or -5-furyl, tetrahydro-2- or -3-furyl, 1,3-dioxolan-4-yl, tetrahydro-2- or -3-thienyl, 2,3-dihydro-1-, -2-, -3-, -4- or -5-pyrrolyl, 2,5-dihydro-1-, -2-, -3-, -4- or -5-pyrrolyl, 1-, 2- or 3-pyrrolidinyl, tetrahydro-1-, -2- or -4-imidazolyl, 2,3-dihydro-1-, -2-, -3-, -4- or -5-pyrazolyl, tetrahydro-1-, -3- or -4-pyrazolyl, 1,4-dihydro-1-, -2-, -3- or -4-pyridyl, 1,2,3,4-tetrahydro-1-, -2-, -3-, -4-, -5- or -6-pyridyl, 1-, 2-, 3- or 4-piperidinyl, 2-, 3- or 4-morpholinyl, tetrahydro-2-, -3- or -4-pyranyl, 1,4-dioxanyl, 1,3-dioxan-2-, -4- or -5-yl, hexahydro-1-, -3- or -4-pyridazinyl, hexahydro-1-, -2-, -4- or -5-pyrimidinyl, 1-, 2- or 3-piperazinyl, 1,2,3,4-tetrahydro-1-, -2-, -3-, -4-, -5-, -6-, -7- or -8-quinolyl, 1,2,3,4-tetrahydro-1-, -2-, -3-, -4-, -5-, -6-, -7- or -8-isoquinolyl, 2-, 3-, 5-, 6-, 7- or 8-3,4-dihydro-2H-benzo-1,4-oxazinyl.

Optionally substituted means unsubstituted or monosubstituted, disubstituted, trisubstituted, tetrasubstituted, pentasubstituted, or even further substituted for each hydrogen, such as persubstituted, on the hydrocarbon.

Aryl might be a $C_6$ to $C_{22}$ aromatic hydrocarbon and may be phenyl, naphthyl, anthracenyl, phenanthryl or biphenyl Arylalkyl might be benzyl.

Heteroaryl may be a $C_5$ to $C_{18}$ heteroaromatic hydrocarbon and may have one or more heteroatoms selected from among N, O and S, and is preferably 2- or 3-furyl, 2- or 3-thienyl, 1-, 2- or 3-pyrrolyl, 1-, 2-, 4- or 5-imidazolyl, 1-, 3-, 4- or 5-pyrazolyl, 2-, 4- or 5-oxazolyl, 3-, 4- or 5-isoxazolyl, 2-, 4- or 5-thiazolyl, 3-, 4- or 5-isothiazolyl, 2-, 3- or 4-pyridyl, 2-, 4-, 5- or 6-pyrimidinyl, also preferably 1,2,3-triazol-1-, -4- or -5-yl, 1,2,4-triazol-1-, -3- or -5-yl, 1- or 5-tetrazolyl, 1,2,3-oxadiazol-4- or -5-yl, 1,2,4-oxadiazol-3- or -5-yl, 1,3,4-thiadiazol-2- or -5-yl, 1,2,4-thiadiazol-3- or -5-yl, 1,2,3-thiadiazol-4- or -5-yl, 3- or 4-pyridazinyl, pyrazinyl, 1-, 2-, 3-, 4-, 5-, 6- or 7-Indolyl, 4- or 5-isoindolyl, 1-, 2-, 4- or 5-benzimidazolyl, 1-, 3-, 4-, 5-, 6- or 7-benzopyrazolyl, 2-, 4-, 5-, 6- or 7-benzoxazolyl, 3-, 4-, 5-, 6- or 7-benzisoxazolyl, 2-, 4-, 5-, 6- or 7-benzothiazolyl, 2-, 4-, 5-, 6- or 7-benzisothiazolyl, 4-, 5-, 6- or 7-benz-2,1,3-oxadiazolyl, 2-, 3-, 4-, 5-, 6-, 7- or 8-quinolyl, 1-, 3-, 4-, 5-, 6-, 7- or 8-isoquinolyl, 3-, 4-, 5-, 6-, 7- or 8-cinnolinyl, 2-, 4-, 5-, 6-, 7- or 8-quinazolinyl, 5- or 6-quinoxalinyl, 2-, 3-, 5-, 6-, 7- or 8-2H-benzo-1,4-oxazinyl, also preferably 1,3-benzodioxol-5-yl, 1,4-benzodioxan-6-yl, 2,1,3-benzothiadiazol-4- or -5-yl or 2,1,3-benzoxadiazol-5-yl.

In a preferred embodiment of the inventive process as shown for formula (VI) or (VII), at least one of R proximal to the —O—P— bond or —$NR^c$—P bond is not hydrogen and is selected from among methyl, ethyl, isopropyl, cyclohexyl, cyclopentyl, phenyl, 2,4,6-triisopropylphenyl, 2,4,6-triethylphenyl, 2,6-dimethylphenyl, 2,6-diethylphenyl, 2-isopropylphenyl, 5-methyl-2-isopropylphenyl, mesityl, 9-phenanthryl, 9-anthracenyl, ferrocenyl, N-(perfluorophenyl)acetamide, N-(4-chlorophenyl)acetamide, N-(naphthalen-1-yl)acetamide, N-benzhydrylacetamide, N-(2,6-diisopropylphenyl)acetamide, 6,8-dimethylpyren-2-yl, 2-pyrenyl, 1-anthracenyl, corannulene, porphyrin, 1-naphthyl, 2-naphthyl, 4-biphenyl, 3,5-(trifluoromethyl)phenyl, 3-(pentafluorsulfanyl)phenyl, 4-(pentafluorsulfanyl)phenyl, 3,5-di(pentafluorsulfanyl)phenyl, fluorenyl, tert-butyl, trismethylsilyl, tert-butydimethylsilyl, phenyldimethylsilyl, methyldiphenylsilyl, tris-mesitylsilyl, tris-phenylsilyl, 3-nitrophenyl, 4-nitrophenyl and 2,6-methyl-4-butylphenyl, trifluoromethyl, unbranched (linear) and branched ($C_1$-$C_{12}$)-perfluoroalkyls, 3,4,5-trifluorophenyl, 1,3-bis (perfluoropropan-2-yl)phenyl, 1,3-bis(perfluorobutyl) phenyl, and/or pentafluorophenyl and also fluoride, chloride, bromide, iodide, COOH, $B(OH)_2$, $B(alkyl)_2$, $B(O-alkyl)_2$, B(pinacol), $BF_3X$ where X=Li, Na or K, OTf. The other groups are preferably hydrogen.

Substituted amino or substituted imino means an amino group or imino group which is substituted by one or two hydrocarbon groups selected from $C_1$ to $C_{20}$ aliphatic hydrocarbons, $C_6$ to $C_{18}$ aromatic hydrocarbons or $C_5$ to $C_{18}$-heteroaromatic hydrocarbons, all of which may optionally be substituted by one or more heterosubstituents, preferably halogen, amino, $C_1$ to $C_6$ alkoxy.

The compounds prepared according to the inventive process can be converted in process steps which are well known per se to those skilled in the art into organic salts, metal salts or metal complexes.

Figure 2A:
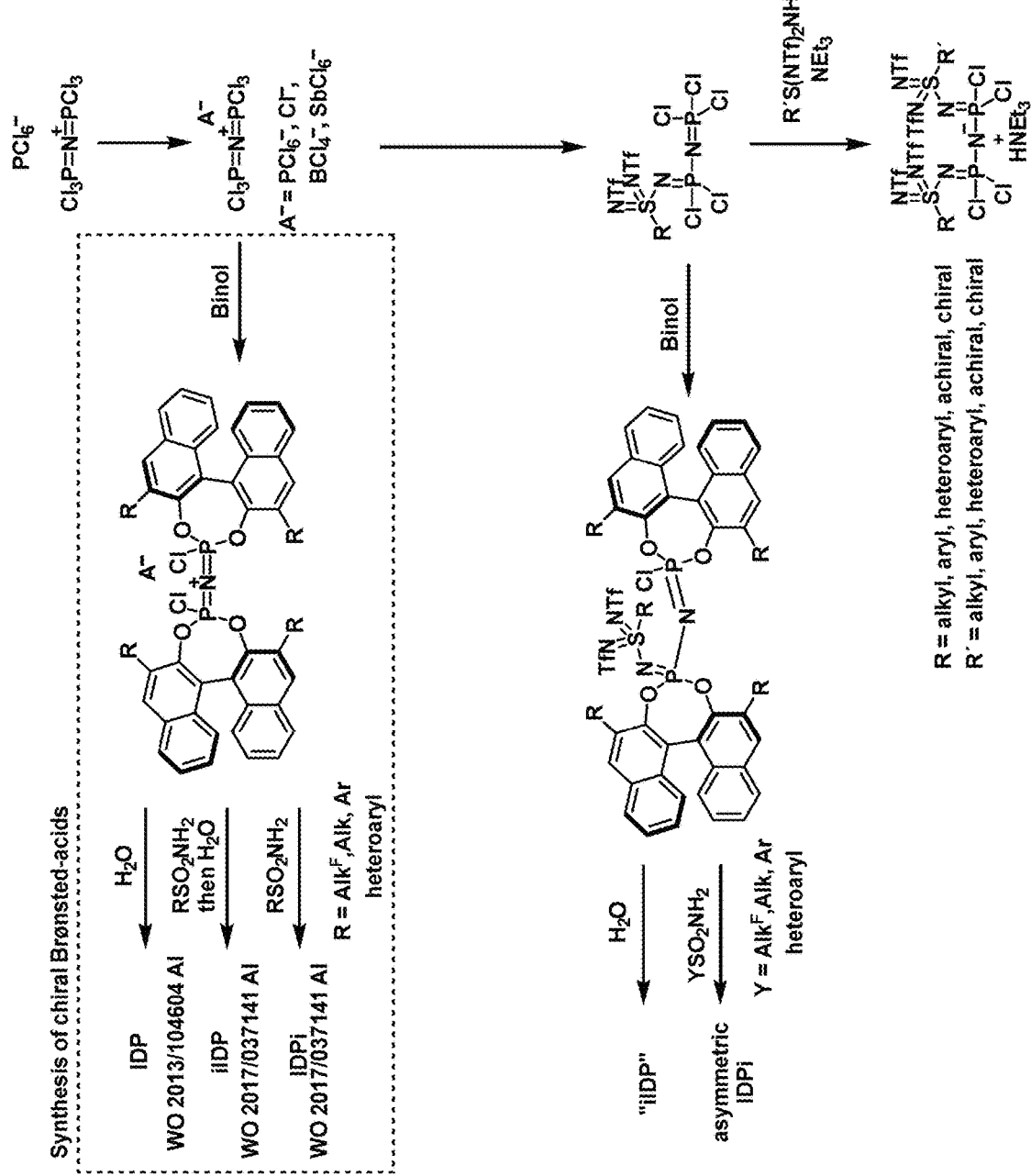
Figure 2B:
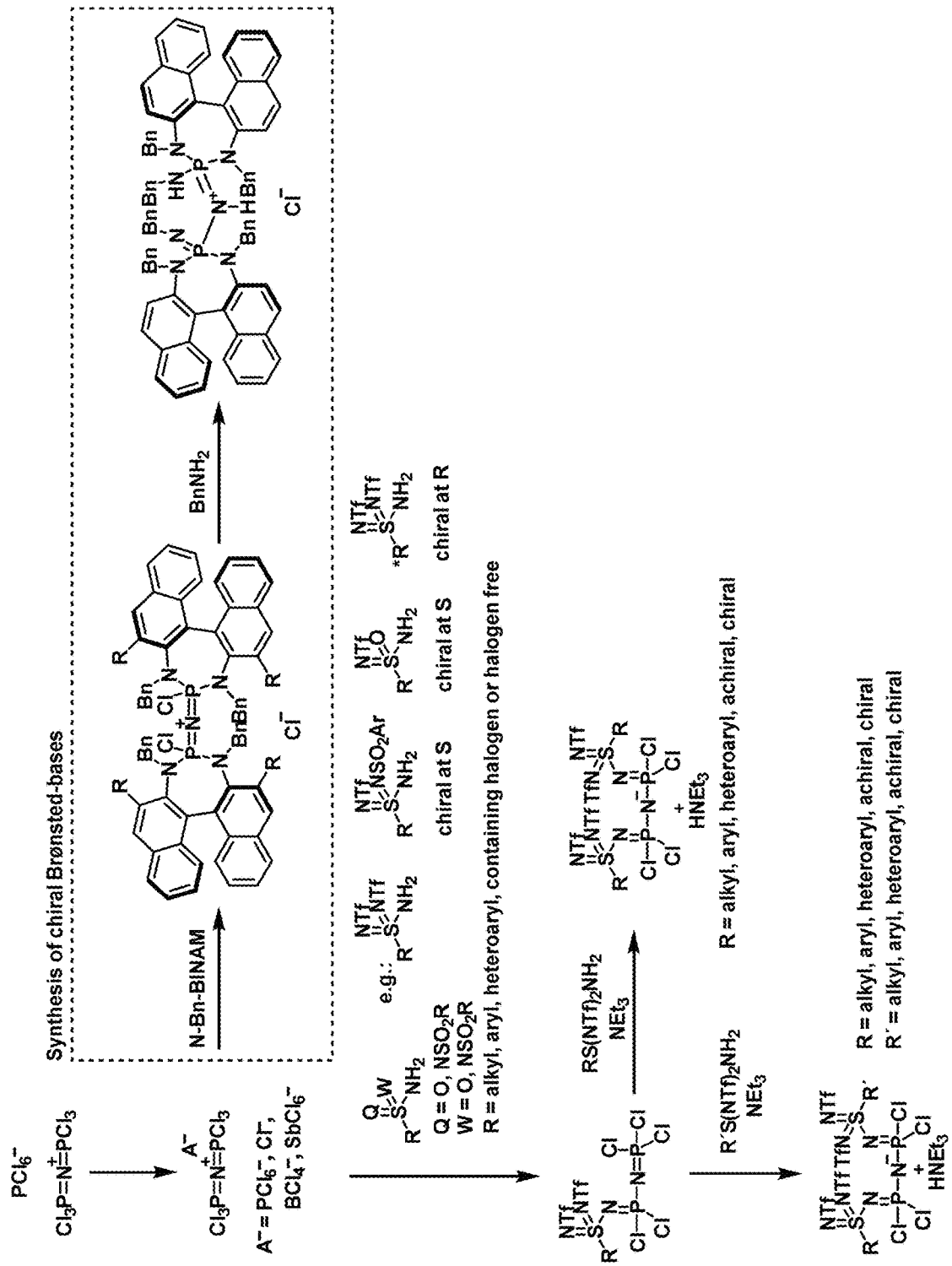
Figure 2C:
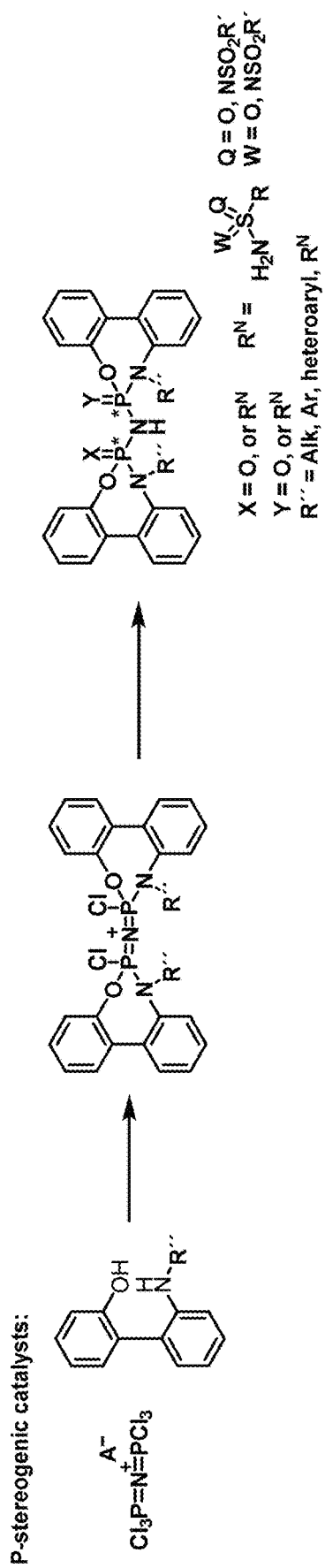
Figure 3A:
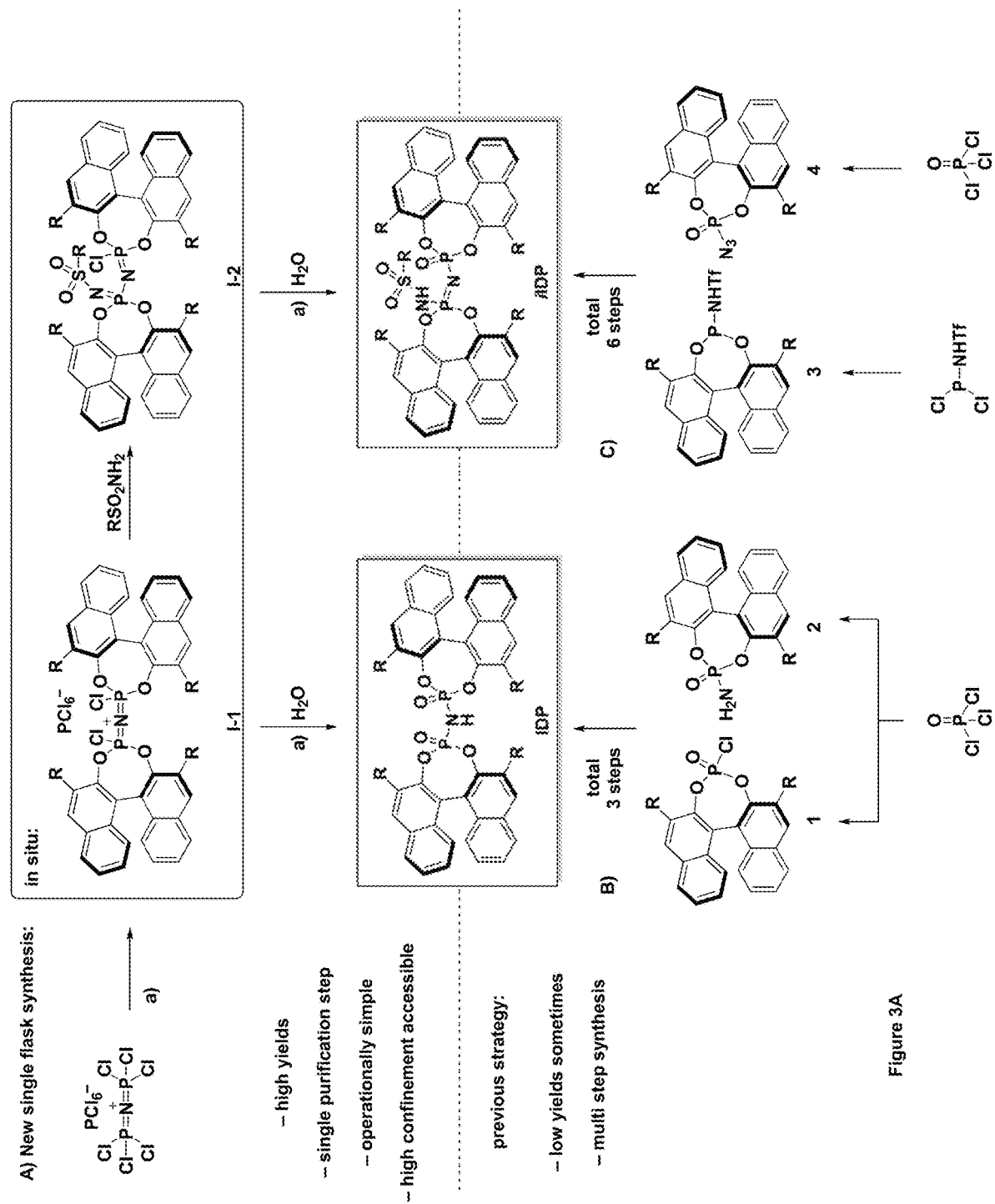
Figure 3B:
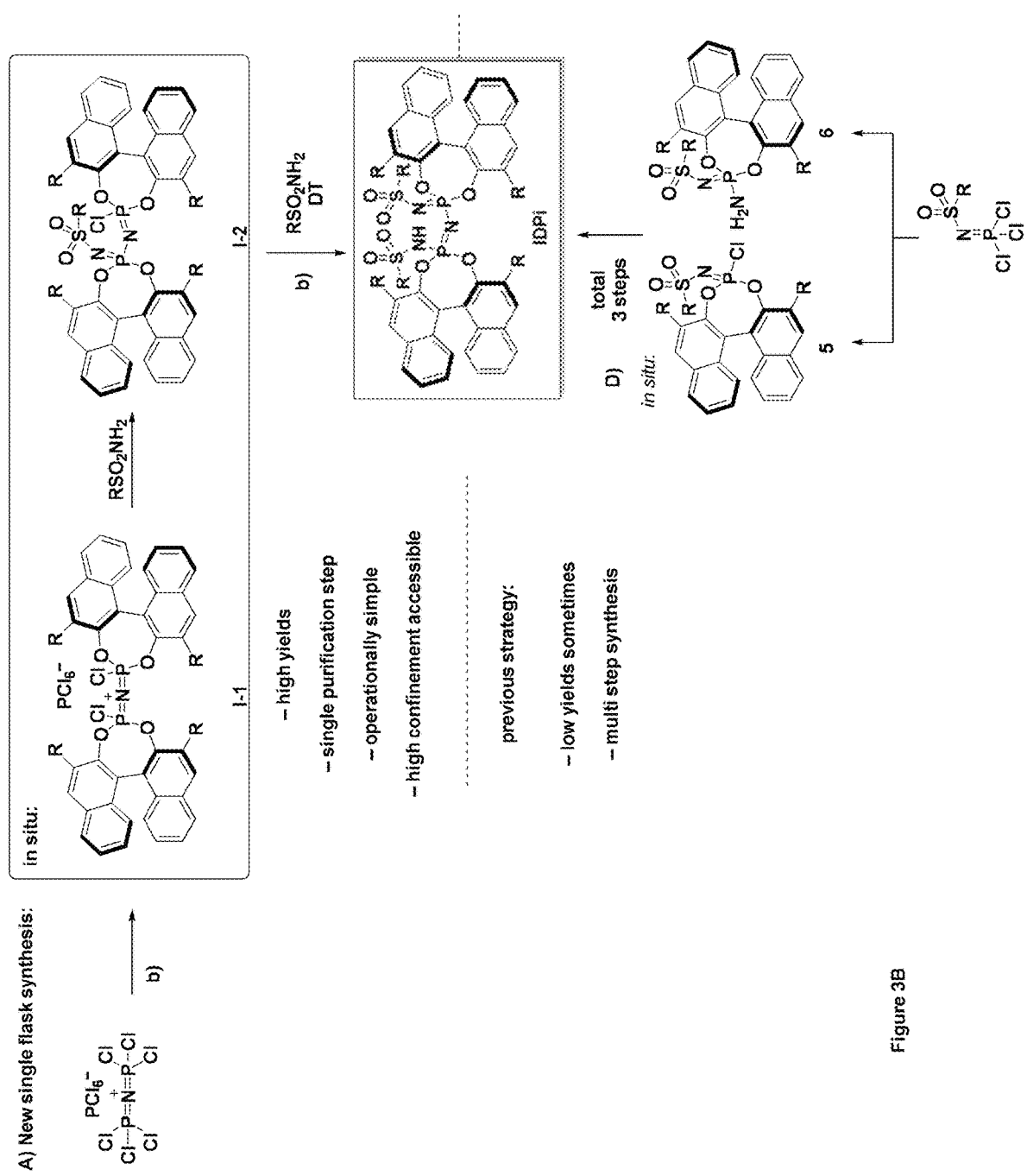
Figure 5A:
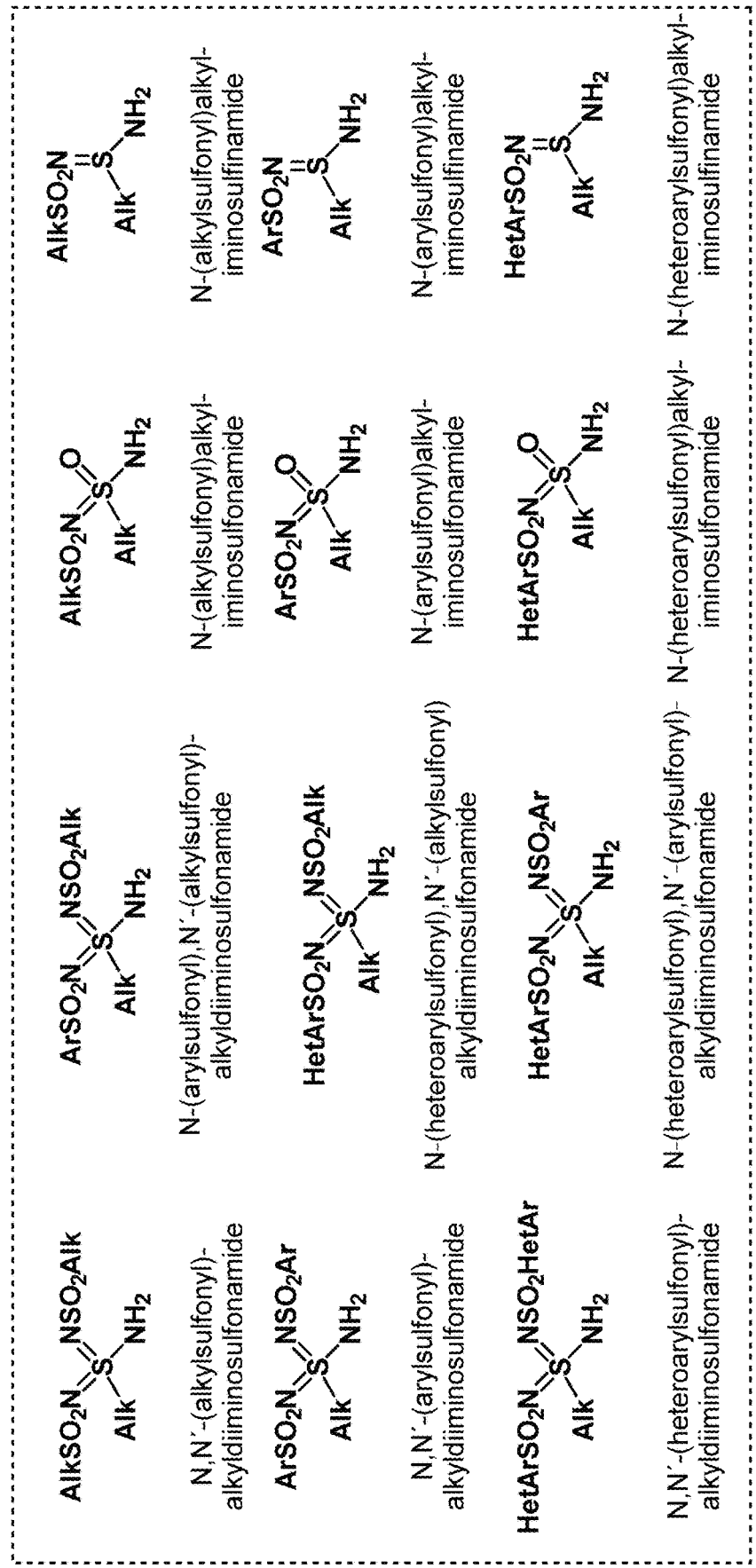
Figure 5B:
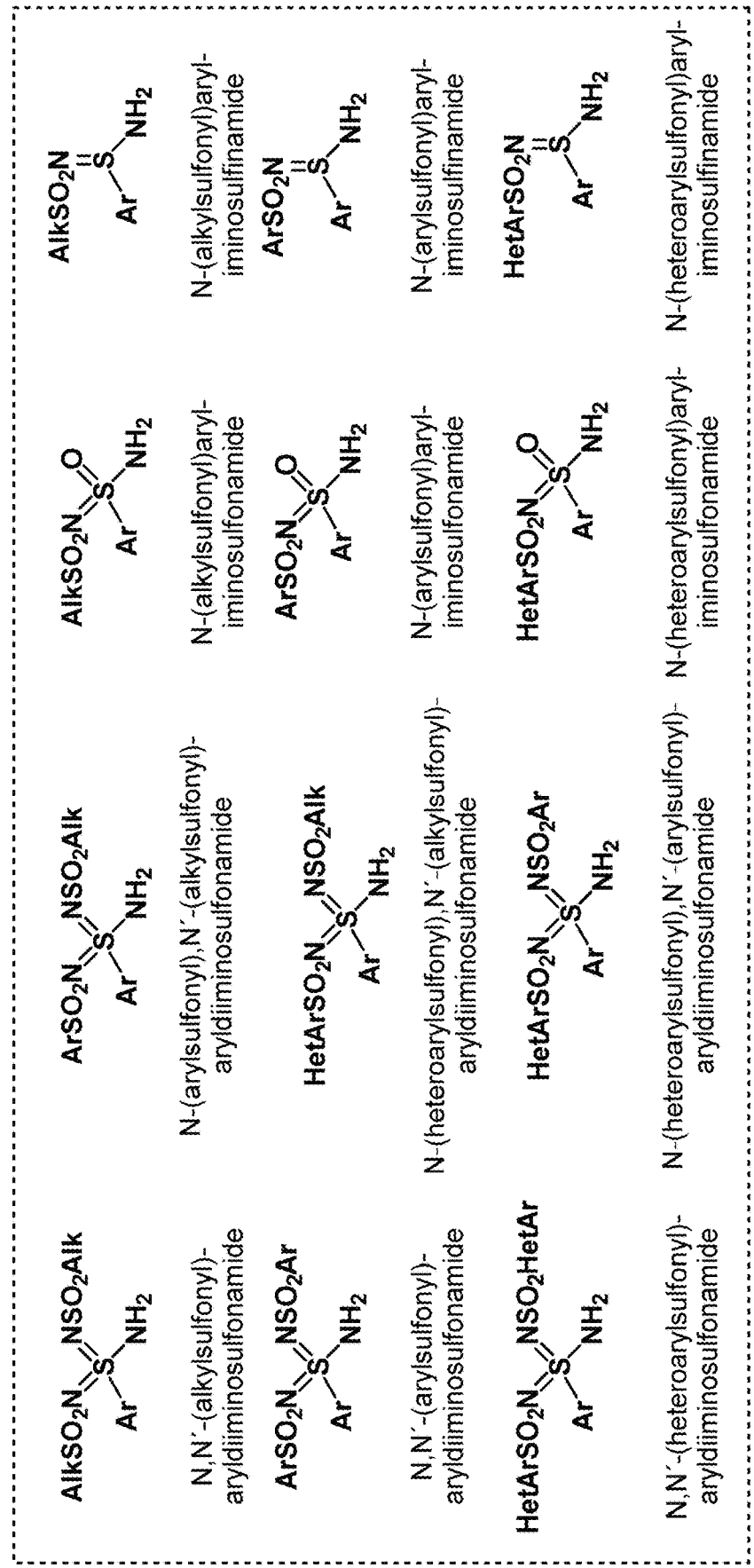
Figure 5C:
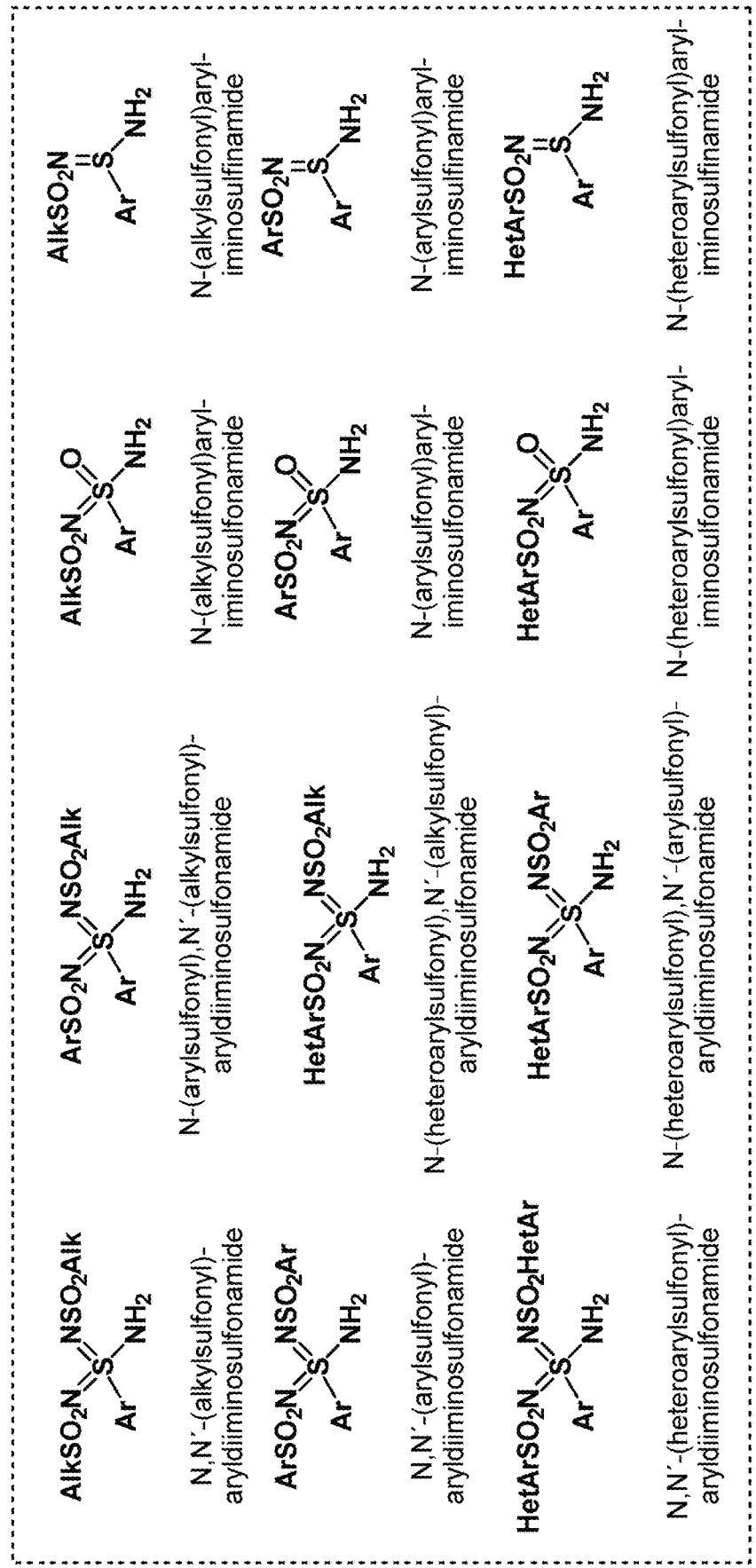

The present invention is further illustrated by the attached Figures and the Examples In the Figures:

FIG. 1 generally describes the inventive synthesis pathway and properties of imidodiphosphoryl-derived Brønsted acids;

FIGS. 2A-C illustrate the inventive reaction scheme in more detail;

FIGS. 3A-B compare the results of the inventive synthesis and the previous strategies;

FIG. 4 illustrates some of the compounds of formula (VI) and (VII) being particularly useful in the inventive process;

FIGS. 5A-C illustrate some of the groups $R^N$ being particularly useful in the inventive process.

EXPERIMENTAL

Example 1: Synthesis of (Trimethylsilyl)Phosphorimidoyl Trichloride

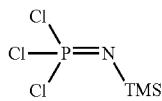

A 500 mL flame dried two necked round bottom flask with dropping funnel was charged with diethylether (200 mL), hexamethyldisilazane (12.5 mL, 60 mmol), cooled to 0° C. (ice bath) followed by the addition of n-butyllithium (24 mL (2.5 M in hexanes), 60 mmol) within 5 minutes at 0° C. The solution was stirred additional 30 minutes at 0° C. and was then allowed to warm to r.t. forming a colorless suspension. The suspension was cooled again to 0° C. (ice bath) followed by the dropwise addition of phosphorous trichloride (5.2 mL, 60 mmol) within 2 minutes. The cooling bath was removed after full addition of phosphorous trichloride and the milky reaction mixture was allowed to warm to r.t. and stirred for additional 30 minutes at r.t. The milky suspension was cooled to 0° C. (ice bath) followed by the dropwise addition of sulfuryl chloride (6 mL, 60 mmol). The colorless suspension was warmed to r.t. again and stirred additional 60 minutes at r.t. followed by inert filtration over a pad of previously dried pad a celite (schlenk frit, height 3 cm of celite) to obtain a colorless filtrate which was carefully concentrated (130 mbar to 30 mbar) at 0° C. under inert conditions. The resulting highly viscous oil was then purified by bulb to bulb distillation under static vacuum (5 mbar, 25 to 40° C.) condensing the desired product −78° C. (Trimethylsilyl)phosphorimidoyl trichloride was isolated as a colorless viscous oil (12 g, 89%).

Procedure is based on the reference: *Inorg Chem.* 2002, 41, 1690

Example 2A: Synthesis of Hexachlorobisphosphazonium Hexachlorophosphate (HCCP)

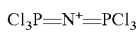

A flame dried 100 mL Schlenk tube was charged with phosphorous pentachloride (16.6 g, 79.8 mmol) followed by the addition of a solution of (trimethylsilyl)phosphorimidoyl trichloride in dichloromethane (25 mL) at 0° C. to form a colorless suspension which was stirred 2.5 h at room temperature. Additional dichloromethane (20 mL) was added followed by inert filtration. The colorless precipitate was washed two times with dichloromethane (40 mL each) and dried in high vacuum (1*10⁻³ mbar) for 5 hours to obtain the desired product, as a colorless powder (15.4 g, 72%).

The procedure is based on reference *Inorganic Chemistry*, 2004, 43, 2765

Example 2B: Alternative One-Step Synthesis of Hexachlorobisphosphazonium Hexachlorophosphate (HCPP)

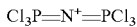

A 250 ml two necked round bottom flask, equipped with a reflux condenser and sulfuric acid filled gas bubbler, was flame-dried under argon. The flask was charged with PCl₅ (53.0 g, 254 mmol, 1 equiv.), NH₄Cl (4.31 g, 80.6 mmol, 0.95 equiv.) and suspended in nitrobenzene (80 ml). The suspension was heated 5.5 h to 130° C. Within the first 3 h a constant gas development was observed, whereas the gas development slowly ceased after that time and most of the solid dissolved during the reaction progress (Note: sublimed PCl₅ was re-dissolved into the reaction mixture by carefully shaking the glass apparatus). The hot reaction mixture was filtered under inert conditions (argon overpressure through filter paper fitted PE-tube) into a 100 ml Schlenk-flask. Upon cooling to r.t., a colorless precipitate formed from the filtrate. The suspension was left o.n. at r.t. and filtered under inert reaction conditions (argon overpressure through filter paper fitted PE-tube). The beige solid was extensively washed with dry hexanes until the filtrates remain colorless and additionally washed with DCM (100 ml) to afford the desired product as a colorless solid (62%, 28.3 g, 53.2 mmol).

The procedure is based on reference *Anorg. Allg. Chem.* 1977, 433, 229

Example 3: Synthesis of Hexachlorobisphosphazonium Chloride

Cl⁻

Cl₃P=N⁺=PCl₃

A flame dried 25 mL schlenk flask was charged with hexachlorobisphosphazonium hexachlorophosphate (2.29 g, 4.30 mmol) and suspended in DCM (30 mL). 4-Dimethylaminopyridine (552 mg, 4.52 mmol, 1.05 equiv.) was added in one portion resulting in the formation of a yellowish solution, of which a colorless precipitate formed within stirring for 5 minutes. The resulting colorless solution was stirred additional 1 h at r.t. followed by cooling in an ice bath. The stirring was stopped and the suspension filtered under inert conditions and the colorless precipitate washed with additional DCM (2×20 mL) and dried in high vacuum to furnish the desired product as a colorless solid (73%, 1.02 g, 3.14 mmol) Procedure is based on reference *Inorganic Chemistry*, 2004, 43, 2765

Example 4: Synthesis of Hexachlorobisphosphazonium Hexachloroantimonate

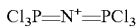

A flame dried 100 mL schlenk flask was charged with hexachlorobisphosphazonium hexachlorophosphate (1.99 g, 3.74 mmol), suspended in DCM (40 mL) and cooled in an acetone/dry ice bath. A second flame dried 25 mL schlenk flask was charged with SbCl₅ (1.18 g, 3.94 mmol, 1.05 equiv.), diluted with DCM (10 mL) and the resulting solution dropwise transferred to the first pre-cooled schlenk via a polyethylene tubing with argon over pressure (1.2 bar). Upon full addition of SbCl$_5$ the formed suspension was stirred 1 h at −78° C. and additional 3 h at r.t. The suspension was filtered under inert conditions and the colorless precipitate washed with additional DCM (10 mL) followed by drying in high vacuum to furnish the desired product as a colorless solid (69%, 1.61 g, 2.59 mmol)

Example 5: Synthesis of Hexachlorobisphosphazonium Tetrachloroborate

A flame dried 25 mL schlenk flask was charged with hexachlorobisphosphazonium hexachlorophosphate (537 mg, 1.01 mmol), suspended in DCM (10 mL). Boron trichloride (1M in heptane, 1.2. mL, 1.19 equiv.) was added. Upon full addition the formed solution was stirred additional 30 min at r.t., followed by concentration of the solution to a total volume of ca. 5 mL to form a suspension. Additional n-hexane (15 mL) was added and the suspension filtered under indert conditions. The colorless precipitate was washed with additional n-hexane (2×10 mL) and the colorless solid dried in high vacuum to furnish the desired product as a colorless solid (64% yield, 285 mg, 646 µmol).

Example 6: Synthesis of (S,S)-4-chloro-N-(4-chloro-2,6-diphenyl-4l5-dinaphtho[2,1-d:1',2'-f][1,3,2]dioxaphosphepin-4-ylidene)-2,6-diphenyl-4l5-dinaphtho[2,1-d:1',2'-f][1,3,2]dioxaphosphepin-4-iminium Chloride

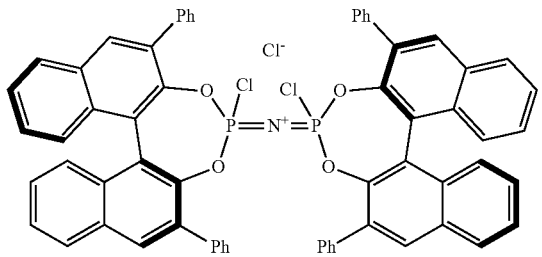

A flame dried 5 mL schlenk tube was charged with hexachlorobisphosphazonium hexachlorophosphate (2, 310 mg, 0.58 mmol) and (S)-3,3'-diphenyl-[1,1'-binaphthalene]-2,2'-diol (510 mg, 1.64 mmol) followed by the addition of anhydrous pyridine (10 mL). The slightly yellow reaction mixture was stirred additional 20 minutes at r.t. followed by removal of all volatile compounds in high vacuum (1*10$^{-3}$ mbar) to obtain a beige precipitate which was re-suspended in ethyl acetate (20 mL). The organic phase was removed via inert filtration and the resulting colorless precipitate was dried in high vacuum (1*10$^{-3}$ mbar) to obtain the desired product (538 mg, 87%).

Example 7: Stepwise Chloride Substitution

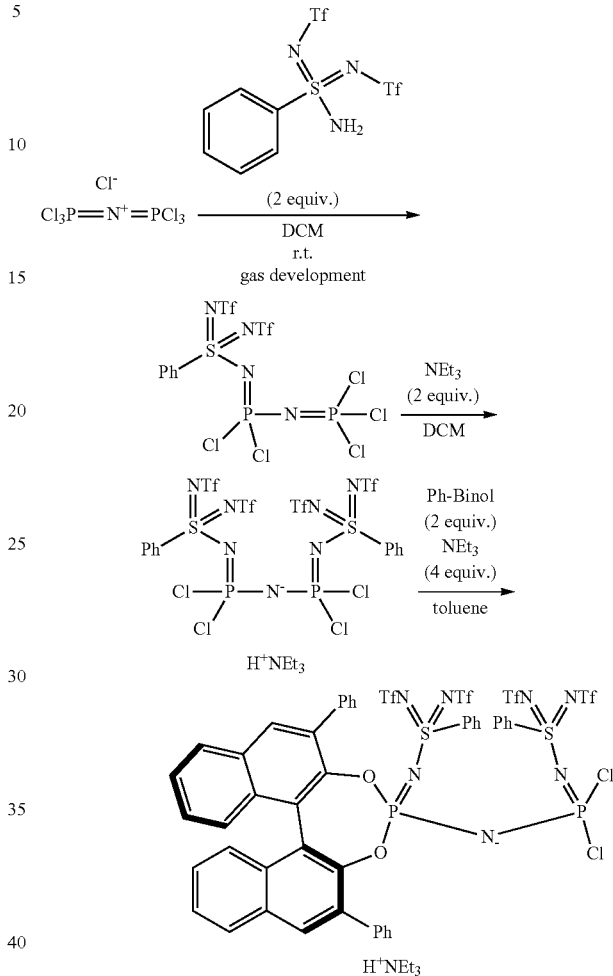

A 10 mL flame dried schlenk tube was charged with hexachlorobisphosphazonium chloride (155 mg, 479 µmol, 1 equiv.) and N,N'-(amino(phenyl)-l6-sulfanediylidene)bis (1,1,1-trifluoromethane-sulfonamide) (402 mg, 959 µmol, 2 equiv.). DCM (1 mL) was added and the resulting suspension stirred (100 rpm) for 1 h until gas evolution ceased and the suspension turned into a slightly orange solution. An aliquote was analyzed by $^{31}$P-NMR, indicating the characteristic signals of the mono addition product ($^{31}$P NMR (203 MHz, CD$_2$Cl$_2$) δ9.36 (d, $^2$J=31.5 Hz), −5.78 (d, $^2$J=31.5 Hz). Additional DCM (2 mL) was added followed by dropwise addition of NEt$_3$ (133 µl, 0.96 mmol, 2 equiv.). The reaction was stirred for 1 h at r.t. and analyzed by $^{31}$P-NMR, indicating the formation of the desired double addition product ($^{31}$P NMR (203 MHz, CD$_2$Cl$_2$) δ−10.39 (s)). All volatiles were removed in vacuo. Toluene (4 mL) and (S)-Phenyl-BINOL (210 mg, 480 µmol, 1 equiv.) was added followed by subsequent addition of NEt$_3$ (300 µl, 2.16 mmol, 4.5 equiv.). The reaction was stirred 16 h at 90° C., analyzed by $^{31}$P-NMR ((203 MHz, CD$_2$Cl$_2$) δ−8.52 (d, $^2$J=60.2 Hz), −13.90 (d, $^2$J=60.2 Hz)) and mass-spectroscopy, indicating the formation of the depicted compound as a crude product with a $^{31}$P-NMR purity of ca. 84%.

Example 8: Synthesis of 3,3-Bis(9-anthracenyl)IDP

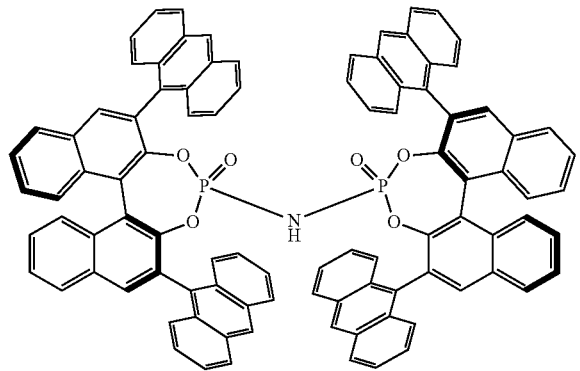

A flame dried 5 mL schlenk tube was charged with hexachlorobisphosphazonium hexachlorophosphate (41 mg, 77 µmol), (S)-3,3'-di(anthracen-9-yl)-[1,1'-binaphthalene]-2,2'-diol (98.4 mg, 154 µmol) followed by the addition of pyridine (1 mL). The suspension was stirred for 15 minutes at r.t. followed by the addition of distilled water (250 µl, 13.8 mmol) via a Pasteur pipette and was stirred additional 17 h at 50° C. After cooling to r.t. the reaction mixture was poured into saturated $NaHCO_3$ solution and extracted with dichloromethane. The combined organic phase was dried over sodium sulfate, concentrated in vacuo and purified by flash column chromatography (dichloromethane) to afford a colorless solid which was acidified with aqueous 6 M HCl. The solid was dissolved in a small quantity of dichloromethane and precipitated with hexanes. After decantation of the organic phase the desired product was obtained as a colorless powder (90 mg, 85%).

Example 9: Synthesis of (S,S)-4-(((2r)-4-oxido-2,6-bis(2,4,6-tripentylphenyl)dinaphtho[2,1-d:1',2'-f][1,3,2]dioxaphosphepin-4-yl)amino)-2,6-bis(2,4,6-tripentylphenyl)dinaphtho[2,1-d:1',2'-f][1,3,2] dioxaphosphepine 4-oxide

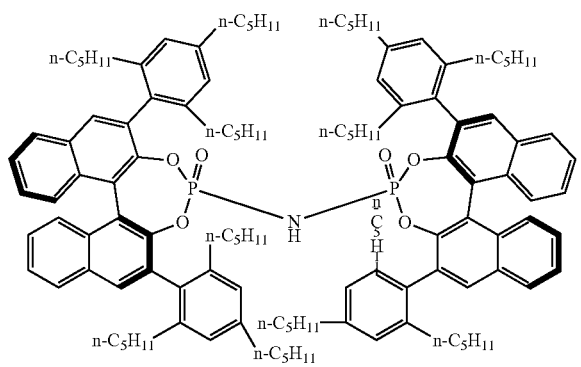

A flame dried 10 mL schlenk tube was charged with hexachlorobisphosphazonium hexachlorophosphate (156 mg, 293 µmol) and a solution of (S)-3,3'-bis(2,4,6-tripentylphenyl)-[1,1'-binaphthalene]-2,2'-diol in pyridine (5 mL). The slightly yellow suspension was stirred for 24 h at r.t. followed by the addition of distilled water (1 mL). The solution was stirred additional 24 h at r.t. followed by the addition of aqueous HCl (6 M, 20 mL) and dichloromethane (20 mL). The aqueous phase was extracted three times with dichloromethane (20 mL each). The combined organic phase was dried over sodium sulfate and concentrated to dryness to afford a colorless oil which was further purified by flash column chromatography (gradient, hexanes then dichloromethane/hexanes (1:4)) to obtain the desired product as a colorless oil. This oil was dissolved in a small quantity of dichloromethane and was washed with aqueous HCl (6 M) to obtain the desired product as a colorless solid (381 mg, 71%).

Example 10: Synthesis of (S,S)-4-(((2r)-4-oxido-2,6-bis(2,4,6-trihexylphenyl)dinaphtho[2,1-d:1',2'-f][1,3,2]dioxaphosphepin-4-yl)amino)-2,6-bis(2,4,6-trihexylphenyl)dinaphtho[2,1-d:1',2'-f][1,3,2] dioxaphosphepine 4-oxide

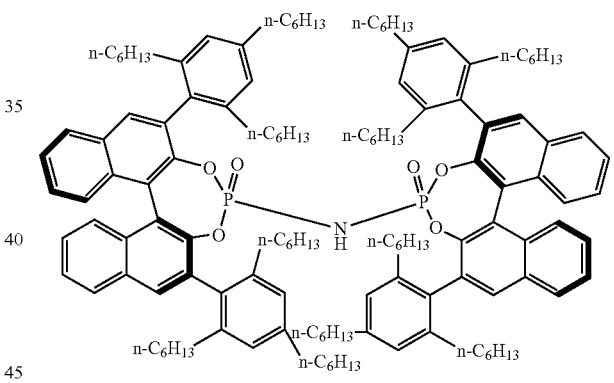

A 10 mL flame dried and argonated schlenk tube was charged with hexachlorobisphosphazonium hexachlorophosphate (46 mg, 86.4 µmol) and dissolved in a solution of (S)-(o,o,p-tri(n-hexyl)phenyl)BINOL (163 mg, 0.17 mmol 2 equiv. in 1.5 mL pyridine). The reaction was stirred for 19 h at r.t. followed by the addition of water (300 µl, 16.6 mmol, 192 equiv.) and stirred additional 5 h at 80° C. until $^{31}$P-NMR analysis shows clean hydrolysis to the desired product. After cooling to r.t. the reaction mixture was poured into 30 mL $HCl_{(aq)}$ and extracted with DCM (3×30 mL). The combined organic phases were dried over sodium sulfate, concentrated to dryness and purified by FCC (Biotage, gradient: hexanes up to hexanes/DCM (1:1)) to elute the desired product as a salt. Acidification was carried out by dissolving the salt in DCM (3 mL) and $HCl_{(aq)}$ (6M, 3 mL). The organic phase was isolated, concentrated to dryness followed by drying o.n. in h.v. to furnish the desired product as a colorless viscous oil (78%, 172 mg).

Example 11: Synthesis of (S,S)-4-(((2r)-4-oxido-2,6-bis(2,4,6-triheptylphenyl)dinaphtho[2,1-d:1',2'-f][1,3,2]dioxaphosphepin-4-yl)amino)-2,6-bis(2,4,6-triheptylphenyl)dinaphtho[2,1-d:1',2'-f][1,3,2]dioxaphosphepine 4-oxide

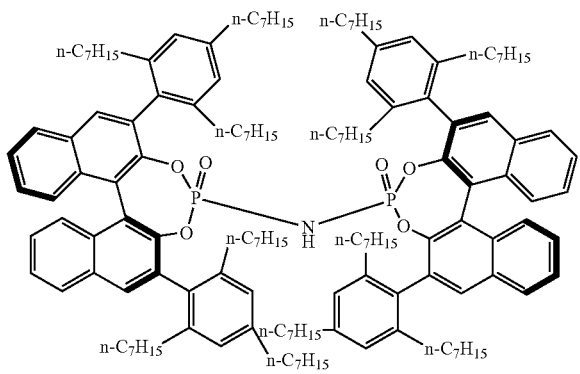

A 10 mL flame dried and argonated schlenk tube was charged with hexachlorobisphosphazonium hexachlorophosphate (117 mg, 220 μmol) and dissolved in a solution of (S)-(o,o,p-tri(n-heptyl)phenyl)BINOL (490 mg, 0.48 mmol 2.1 equiv. in 4 mL pyridine). The reaction was stirred for 19 h at r.t. followed by the addition of water (800 μl, 44.4 mmol, 202 equiv.) and stirred additional 5 h at 80° C. until $^{31}$P-NMR analysis shows clean hydrolysis to the desired product. After cooling to r.t. the reaction mixture was poured into 30 mL HCl$_{(aq)}$ and extracted with DCM (3×30 mL). The combined organic phases were dried over sodium sulfate, concentrated to dryness and purified by FCC (Biotage, gradient: hexanes up to hexanes/DCM (3:2)) to elute the desired product as a salt. Acidification was carried out by dissolving the salt in DCM (5 mL) and HCl$_{(aq)}$ (6M, 5 mL). The organic phase was isolated, concentrated to dryness followed by drying o.n. in h.v. to furnish the desired product as a colorless viscous oil (82%, 389 mg)

Example 12: Synthesis of (S,S)-4-(((2r)-4-oxido-2,6-bis(2,4,6-tri-(2-propyl)phenyl)dinaphtho[2,1-d:1',2'-f][1,3,2]dioxaphosphepin-4-yl)amino)-2,6-bis(2,4,6-tri-(2-propyl)phenyl)dinaphtho[2,1-d:1',2'-f][1,3,2]dioxaphosphepine 4-oxide

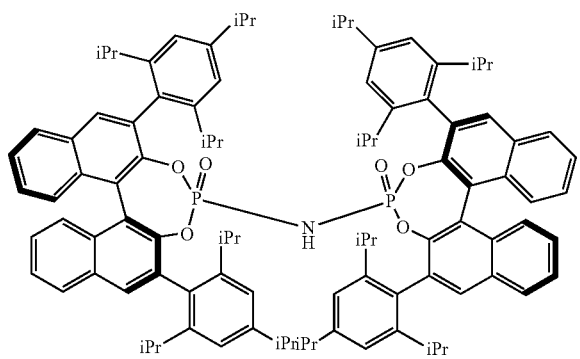

A 25 mL flame dried and argonated schlenk tube was charged with hexachlorobisphosphazonium hexachlorophosphate (472 mg, 887 μmol) and (S)-(o,o,p-tri(2-propyl)phenyl)BINOL (1.23 g, 1.78 mmol 2.0 equiv) followed by the addition of pyridine (9 mL). The reaction was stirred for 12 h at r.t. followed by the addition of water (320 μl, 17.7 mmol, 20 equiv.) and stirred additional 16 h at 80° C. After cooling to r.t. the reaction mixture was poured into 20 mL HCl$_{(aq)}$ and extracted with DCM (3×30 mL). The combined organic phases were dried over sodium sulfate, concentrated to dryness and purified by FCC (Biotage, gradient: hexanes up to hexanes/DCM (3:2)) to elute the desired product as a salt. Acidification was carried out by dissolving the salt in DCM (10 mL) and HCl$_{(aq)}$ (6M, 10 mL). The organic phase was isolated, concentrated to dryness followed by drying o.n. in h.v. to furnish the desired product as a colorless solid (35%, 462 mg)

Example 13: Synthesis of 1,1,1-trifluoro-N-((2r)-4-(((2s)-4-oxido-2,6-bis(2,4,6-triisopropylphenyl)dinaphtho[2,1-d:1',2'-f][1,3,2]dioxaphosphepin-4-yl)imino)-2,6-bis(2,4,6-triisopropylphenyl)-4l5-dinaphtho[2,1-d:1',2'-f][1,3,2]dioxaphosphepin-4-yl)methanesulfonamide

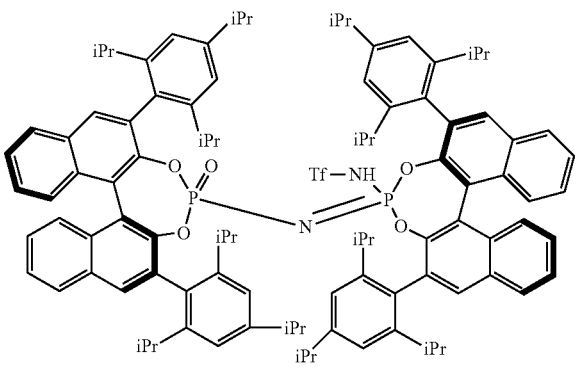

A flame dried 10 mL Young-schlenk tube was charged with hexachlorobisphosphazonium hexachlorophosphate (99.0 mg, 186 μmol), (S)-3,3'-di(2,4,6-triisopropylphenyl)-[1,1'-binaphthalene]-2,2'-diol (268 mg, 388 μmol 2.09 equiv.) followed by the addition of toluene (2 mL) and subsequent dropwise addition of NEt$_3$ (109 μL, 781 μmol, 4.2 equiv.) to form a colorless suspension, which was stirred additional 1.5 h at r.t. TfNH$_2$ (243 mg, 1.63 mmol, 8.76 equiv.) was added in one portion followed by addition of additional NEt$_3$ (415 μL, 2.98 mmol, 16.0 equiv.) and the suspension stirred additional 25 h at 80° C. 4-DMAP (20.5 mg, 0.167 μmol, 0.90 equiv.) was added and the reaction mixture stirred 17 h at 110° C. Water (2 mL) and DCM (2 mL) was added and the emulsion stirred additional 16 h at r.t., followed by isolation of the organic phase, which was dried over sodium sulfate, concentrated to dryness and the resulting crude product was purified by FCC (hexanes/EtOAc 9:1) to elute the desired product as a salt. The salt was dissolved in DCM (10 mL) and acidified with HCl (6 M, 10 mL) for 30 min at r.t. The organic phase was isolated, concentrated to dryness and dried in high vacuum o.n. to afford the desired product in acidic form (64%, 194 mg, 186 μmol).

Example 14: Synthesis of (S,S)-1,1,1-trifluoro-N-(4-((4-oxido-2,6-diphenyldinaphtho[2,1-d:1',2'-f][1,3,2]dioxaphosphepin-4-yl)imino)-2,6-diphenyl-4l5-dinaphtho[2,1-d:1',2'-f][1,3,2]dioxaphosphepin-4-yl)methanesulfonamide

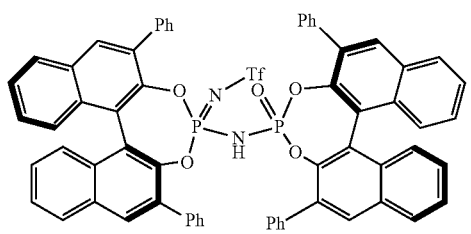

A flame dried schlenk was charged with hexachlorobisphosphazonium hexachlorophosphate (62.8 mg, 118 µmol), (S)-3,3'-diphenyl-[1,1'-binaphthalene]-2,2'-diol (104 mg, 237 µmol) followed by the addition of pyridine (1 mL). The yellow reaction mixture was stirred additional 3 h at r.t. followed by the addition of solid trifluoromethanesulfonamide (90 mg, 604 µmol) and the resulting suspension was stirred for 72 h at r.t. Distilled water (100 µl, 5.55 mmol) was added and the yellow suspension stirred for additional 4 h at r.t., followed by quenching with aqueous HCl (10%) and the aqueous phase was extracted with dichloromethane. The combined organic phase was dried over sodium sulfate, concentrated to dryness. The crude product was purified by flash column chromatography (hexanes/ethyl acetate/dichloromethane (4:2:4)) to furnish a colorless solid, which was filtered over a pad of Dowex 50WX80 (acidic form) to afford the desired product as a colorless solid (65 mg, 49%) which was reprepitated from dichloromethane/pentane followed by drying in high vacuum.

Example 15: Synthesis of (S,S)-1,1,1-trifluoro-N-(4-((4-oxido-2,6-bis(4-(pentafluoro-l6-sulfanyl)phenyl)dinaphtho[2,1-d:1',2'-f][1,3,2]dioxa-phosphepin-4-yl)amino)-2,6-bis(4-(pentafluoro-l6-sulfanyl)phenyl)-4l5-dinaphtho[2,1-d:1',2'-f][1,3,2]dioxaphosphepin-4-ylidene)methane-sulfonamide

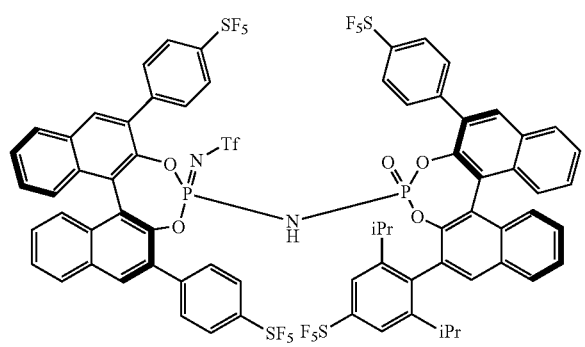

A flame dried schlenk was charged with hexachlorobisphosphazonium hexachlorophosphate (56.8 g mg, 107 µmol), (S)-3,3'-bis(4-(pentafluoro-l6-sulfanyl)phenyl)-[1,1'-binaphthalene]-2,2'-diol (147 mg, 213 µmol) followed by the addition of pyridine (1 mL). The yellow reaction mixture was stirred additional 3 h at r.t. followed by the addition of solid trifluoromethanesulfonamide (90 mg, 604 µmol) and the resulting suspension was stirred for 17 h r.t. Distilled water (100 µl, 5.55 mmol) was added and the yellow suspension stirred for additional 4 h at r.t., followed by quenching with aqueous HCl (10%) and the aqueous phase was extracted with dichloromethane. The combined organic phase was dried over sodium sulfate, concentrated to dryness. The crude product was purified by flash column chromatography (hexanes/ethyl acetate (5:1 to 3:1)) to furnish a colorless solid, which was filtered over a pad of Dowex 50WX80 (acidic form) to afford the desired product as a colorless solid (123 mg, 71%) which was reprepitated from dichloromethane/n-pentane followed by drying in high vacuum.

Example 16: Synthesis of N-(4-((4-oxido-2,6-bis(4-(trifluoromethyl)phenyl)dinaphtho[2,1-d:1',2'-f][1,3,2]dioxaphosphepin-4-yl)amino)-2,6-bis(4-(trifluoromethyl)phenyl)-4l5-dinaphtho[2,1-d:1',2'-f][1,3,2]dioxa-phosphepin-4-ylidene)-3,5-bis(trifluoromethyl)benzenesulfonamide

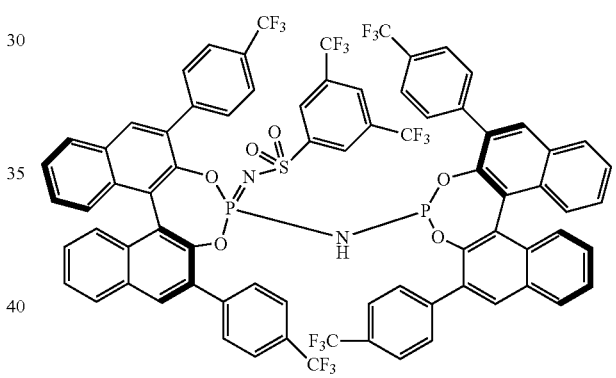

An under high vacuum flame-dried and argonated Schlenk flask was charged with HCPP (67.3 mg, 0.126 mmol, 1.0 equiv.), (S)-3,3'-bis(4-trifluoromethylphenyl)-BINOL (161 mg, mmol, 2.0 equiv.) followed by the addition of pyridine (1 mL) to form a clear yellow solution, which was stirred until full consumption of BINOL (1 h) resulting in the formation of a suspension. 3,5-bis(trifluoromethyl)benzenesulfonamide (94.2 mg, 0.632 mmol, 4.9 equiv.) was added and the reaction mixture stirred additional 1 h at room temperature. Water (0.15 mL, 10 wt %) was added and the reaction stirred additional 16 h, at room temperature, followed by the addition of an excess of HCl (10 wt %) to quench the reaction. The aqueous phase was extracted with $C_2Cl_2$ and the combined organic layers were washed with brine, dried over $NaSO_4$ and concentrated to dryness. The obtained solid was purified by column chromatography (Pentane:$Et_2O$ with a gradient of 4:1 to 2:1) to furnish the desired product as a salt which was further acidified as a DCM solution by filtration over a pad of DOWEX 50WX-8 to obtain the desired product in acidic form (65%, 51.3° mg, 94.0 µmol)

Example 17: Synthesis of Sodium (S-phenyl-N-((trifluoromethyl) sulfonyl)sulfinimidoyl)-((trifluoromethyl)sulfonyl)amide

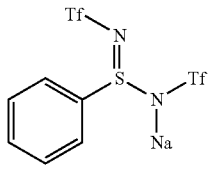

A 500 mL flame dried two necked flask with 100 mL dropping funnel was charged with potassium tert-butoxide (23.0 g, 205 mmol), tetrahydrofurane (250 mL) and cooled to 0° C. (ice bath). Iodine (46.1 g, 182 mmol) was added in small portions within 20 minutes under vigorous stirring of the resulting dark brown suspension. After full addition the resulting dark brown suspension was stirred additional 1 h at 0° C. The dropping funnel was charged with a solution of trifluoromethanesulfonamide (10.8 g, 72.6 mmol) and thiophenol (4.00 g, 36.3 mmol) in acetonitrile (50 mL). The solution of the dropping funnel was added dropwise within minutes to the dark brown suspension under vigorous stirring at 0° C. After full addition the resulting dark brown suspension was stirred additional 17 h at r.t. followed by the addition of a saturated aqueous solution of sodium thiosulfate until the dark brown suspension turned into a slightly yellow suspension. The suspension was transferred to a 1 L separating funnel. The 500 mL two necked round bottom flask was rinsed with diethylether (150 mL) and added to the dropping funnel. The organic phase was washed with sodium sulfate (twice, 200 mL each), brine (200 mL), dried over sodium sulfate and concentrated to dryness. After flash column chromatography (gradient, pure dichloromethane then dichloromethane/acetone (3:2)) the desired product was isolated as a colorless solid (8.54 g, 55%).

Example 18: Synthesis of N,N'-(amino(phenyl)-l6-sulfanediylidene)bis(1,1,1-trifluoromethane-sulfonamide)

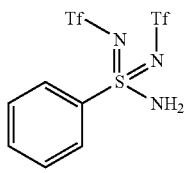

A 20 mL microwave vessel was charged with sodium (S-phenyl-N-((trifluoromethyl)sulfonyl)sulfinimidoyl)-((trifluoromethyl)sulfonyl)amide (2.00 g, 4.69 mmol), Selectfluor (4.26 g, 12.0 mmol) and acetonitrile (10 mL). The suspension was heated for 60 minutes in a microwave (Biotage® Initiator+) reactor (100° C., 1 bar overpressure) and was then transferred to a flame dried 100 mL round bottom flask with argon adapter. All volatile compounds were removed in high vacuum ($1*10^{-3}$ mbar) to afford a yellow precipitate. This precipitate was suspended in dichloromethane (20 mL) and transferred with argon overpressure through a PE-tube into a celite filled schlenk frit (3 cm height). The filtrate was collected in a 100 mL flame dried schlenk tube. The precipitate was washed two times with dichloromethane (20 mL each) and filtered and mentioned above. The combined dichloromethane solution containing the desired sulfonyl fluoride $PhS(NTf)_2F$ was treated with anhydrous ammonia gas for 15 minutes resulting in the formation of a colorless suspension. This suspension was transferred to a 250 mL round bottom flask and concentrated to dryness. Diethylether (50 mL) and aqueous HCl (6 M, 50 mL) were added and the emulsion transferred to a 250 mL separating funnel. The organic phase was washed additional two times with aqueous HCl (6 M, 50 mL each), brine and concentrated to dryness. The resulting colorless precipitate was recrystallized in toluene to afford the desired product as a colorless and crystalline solid (1.20 g, 61%).

Example 19: Synthesis of (S,S)— N,N'-(((4-((4-oxido-2,6-diphenyldinaphtho[2,1-d:1',2'-f][1,3,2]dioxaphosphepin-4-yl)amino)-2,6-diphenyl-4l5-dinaphtho[2,1-d:1',2'-f][1,3,2]dioxaphosphepin-4-ylidene)amino)(phenyl)-l6-sulfanediylidene)bis(1,1,1-trifluoromethanesulfonamide)

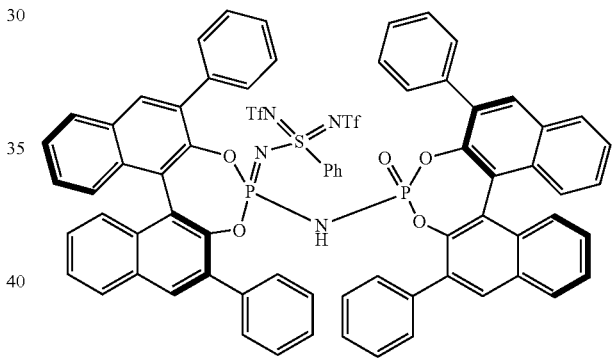

A 5 mL flame dried schlenk tube was charged with hexachlorobisphosphazonium hexachlorophosphate (146 mg, 274 µmol), (S)-3,3'-bis(phenyl)-[1,1'-binaphthalene]-2,2'-diol (239 mg, 546 µmol) followed by the addition of pyridine (3 mL). The slightly yellow suspension was stirred for 3 h at r.t. followed by the addition of N,N'-(amino(phenyl)-l6-sulfanediylidene)bis(1,1,1-trifluoromethane-sulfonamide) (345 mg, 823 µmol) and was stirred 4 d at r.t. Distilled water (300 µl mL, 16.6 mmol) was added resulting in a beige suspension which was stirred additional 16 h at r.t. The suspension was poured into a mixture of aqueous 6 M HCl (30 mL) and dichloromethane (30 mL) and was transferred to a separating funnel. The aqueous phase was extracted additional two times with dichloromethane (30 mL each) and the combined organic phase was dried over sodium sulfate and was concentrated to dryness. The crude product was further purified by flash column chromatography (ethyl acetate/hexanes (1:2)) to afford a colorless crystalline solid which was filtered through Dowex 50WX80 (acidic form, 8 cm height) to furnish the desired product as a colorless solid (100 mg, 26%).

Example 20: Synthesis of (S,S)—N,N'-(((4-((2,6-bis (3,5-bis(trifluoromethyl)phenyl)-4-oxidodinaphtho [2,1-d:1',2'-f][1,3,2]dioxaphosphepin-4-yl)amino)-2, 6-bis(3,5-bis(trifluoromethyl)phenyl)-4l5-dinaphtho [2,1-d:1',2'-f][1,3,2]dioxaphosphepin-4-ylidene) amino)(phenyl)-l6-sulfanediylidene)bis(1,1,1-trifluoromethanesulfonamide)

Example 21: Synthesis of N-((2s)-4-(((E)-2-((Z)-but-2-en-1-ylidene)-4,8-dimesityl-6-((trifluoromethyl)sulfonamido)-1,2-dihydro-6l5-benzo[d]naphtha [1,2-f][1,3,2]dioxaphosphepin-6-ylidene)amino)-2,6-dimesityl-4l5-dinaphtho [2,1-d:1',2'-f][1,3,2] dioxaphosphepin-4-ylidene)-1,1,1-trifluoromethane sulfonamide

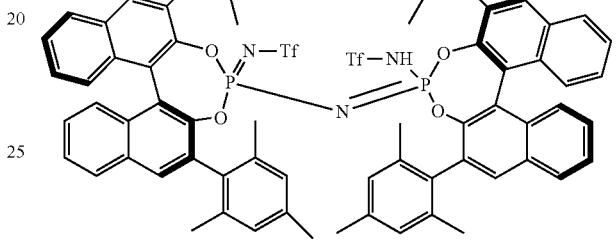

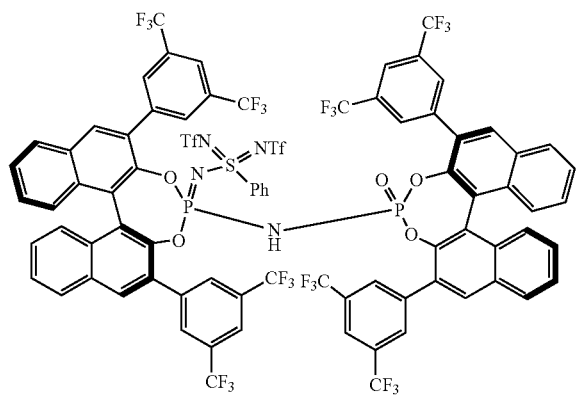

A 25 mL flame dried schlenk tube was charged with hexachlorobisphosphazonium hexachlorophosphate (155 mg, 291 µmol), (S)-3,3'-bis(3,5-bis(trifluoromethyl)phenyl)-[1,1'-binaphthalene]-2,2'-diol followed by the addition of pyridine (5 mL). The slightly yellow suspension was stirred for 90 minutes at r.t. followed by the addition of N,N'-(amino(phenyl)-l6-sulfanediylidene)bis(1,1,1-trifluoromethanesulfonamide) (420 mg, 1 mmol) and was stirred 72 h at 60° C. After cooling to r.t. distilled water (1 mL, 27 mmol) was added resulting in a beige suspension which was stirred additional 24 h at r.t. The suspension was poured into a mixture of aqueous 6 M HCl (30 mL) and dichloromethane (30 mL) and was transferred to a separating funnel. The aqueous phase was extracted additional two times with dichloromethane (30 mL each) and the combined organic phase was dried over sodium sulfate and was concentrated to dryness. The crude product was further purified by flash column chromatography (ethyl acetate/hexanes (1:4)) to afford a colorless crystalline solid which was filtered through Dowex 50WX80 (acidic form, 8 cm height) to furnish the desired product as a colorless solid (92 mg, 16%).

A 10 mL flame dried schlenk tube was charged with hexachlorobisphosphazonium hexachlorophosphate (129 mg, 0.24 mmol, 1 equiv.), (S)-Mesityl-Binol (271 mg, 0.52 mmol, 2.1 equiv.) and suspended in toluene (5 mL). Triethylamine (0.15 mL, 1.09 mmol, 4.5 equiv.) was added dropwise via a Hamilton syringe under vigorous stirring forming a slightly orange suspension in which the color faded away within 5 minutes at r.t. The resulting colorless suspension was stirred additional 60 minutes at r.t. followed by addition of TfNH$_2$ (289 mg, 1.94 mmol, 8 equiv.) additional triethylamine (0.54 mL, 3.88 mmol, 16 equiv.) was added and the suspension stirred additional 26 hours at 80° C. The orange suspension was cooled to r.t. followed by addition of 4-dimethylaminopyridine (26.6 mg, 0.22 mmol, 0.9 equiv.) and stirred for additional 6 d at 100° C. The reaction mixture was then analyzed by NMR (a small aliquote was transferred to an NMR tube under inert conditions, all volatiles removed in high vacuum followed by addition of DCM-d2) showing a conversion of approximately 60% to the desired product. The reaction mixture was then quenched with ca. 1 mL aqueous HCl (6 M) followed by dilution with dichloromethane (ca. 10 mL). The mixture was transferred to a 25 mL separation funnel and washed with HCl (6 M, 10 mL) followed by washing with sat. NaHCO$_{3(aq)}$ (2 times 10 mL each). The organic phase was dried over sodium sulfate, concentrated to dryness followed by FCC (Biotage, gradient: n-hexane/EtOAc (100/0) up to (60/40) to elute the intermediate, in which only one chloride has been substituted (36%, 114 mg) and the desired product as salt (m=126 mg, 44% yield referred to the sodium salt). 46 mg of this salt was dissolved in a small quantity of dichloromethane and passed through a column filled with Dowex 40Wx8 to obtain the desired product in acidic form (42 mg, 93%).

Example 22: 6,6'-azanediylbis(7-methyl-7H-dibenzo [d,f][1,3,2]oxaza phosphepine 6-oxide

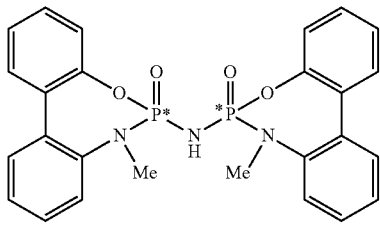

A 10 mL flame dried schlenk tube was charged with hexachlorobisphosphazonium hexachlorophosphate (327 mg, 0.62 mmol, 1 equiv.), 2'-(methylamino)-[1,1'-biphenyl]-2-ol (245 mg, 1.25 mmol, 2 equiv.) and dissolved in pre-cooled (0° C.) pyridine (3.50 mL). The yellow reaction mixture was stirred for 2.5 h at 0° C. (ice bath) followed by the addition of water (0.22 mL, 12.3 mmol, 20 equiv.). The reaction was then stirred o.n. at r.t. followed by the addition of 6 N HCl (ca. 5 mL) and extracting the aqueous phase with dichloromethane (3×20 mL). The combined organic phase was dried over sodium sulfate, concentrated to dryness followed by flash column chromatography (DCM/EtOAc (4/1)) to elute the desired product in salt form which was subsequently acidified with 6N HCl$_{(aq)}$/DCM (10 mL 1/1 v/v/%). The desired product (153 mg, 49%) was isolated as a mixture of diastereomers, which were resolved by preparative HPLC (Deicel Chiralpak QN-AX, 150 mm, 21 mm, MeOH/HOAc, NH$_4$Ac=98:2:0.5 (v/v/w), 20 mL/min) to afford the corresponding enantioenriched products.

Example 23: Synthesis of (S)-6-(((R)-6-oxido-7-tosyl-7H-dibenzo [d,f][1,3,2]oxazaphosphepin-6-yl)amino)-7-tosyl-7H-dibenzo[d,f][1,3,2] oxazaphosphepine 6-oxide

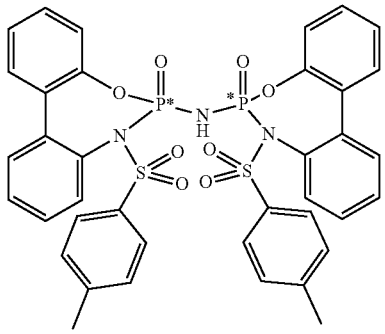

A 10 mL flame dried schlenk tube was charged with hexachlorobisphosphazonium hexachlorophosphate (35.4 mg, 72.0 µmol, 1 equiv.), 2'-(N-tosyl)-[1,1'-biphenyl]-2-ol (54.5 mg, 152 µmol, 2.1 equiv.) and dissolved in THF. NaH (dispersion, 60%, 8.69 mg, 217 µmol, 3 equiv.) was added and the reaction stirred 1.5 h at r.t. Aqeuous NaOH (1 M, 700 µl) was added and the reaction stirred additional 45 min at r.t. EtOAc (5 mL) was added and the organic phase washed with aqueous HCl (10%, 2×5 mL) and dried in vacuo to afford a crude product (52.1 mg). A part of this crude product was purified by preparative TLC (EtOAc/DCM 1:4) to afford the title product as salt, which comprises inherent chirality based on analytical HPLC measurement (150 mm Chiralpak QN-AX, 4.6 mm, MeOH/HOAc/NH$_4$OAc=98.2:0.5 (v/v/w)).

Example 24: Synthesis of (S,S)-3,5-dibenzyl-4-(benzylamino)-N-(3,5-dibenzyl-4-(benzylamino)-4,5-dihydro-3H-4λ$^5$-dinaphtho[2,1-d:1',2'-f][1,3,2]diazaphosphepin-4-ylidene)-4,5-dihydro-3H-4λ$^5$-dinaphtho[2,1-d:1',2'-f][1,3,2]diazaphosphepin-4-iminium chloride

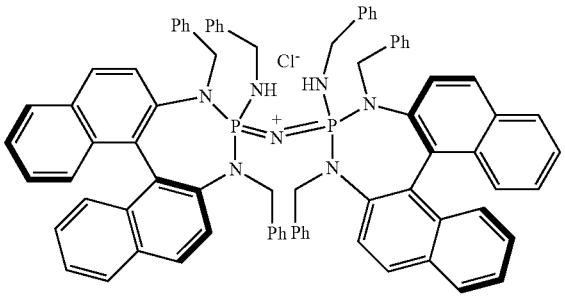

A flame dried schlenk was charged with hexachlorobisphosphazonium chloride (32.4 mg, 0.1 mmol), (S)—N2,N2'-dibenzyl-(1,1'-binaphthalene)-2,2'-diamine (97.6 mg, 0.21 mmol) followed by the addition of pyridine (1 mL). The brown reaction mixture was stirred additional 12 h at 100° C. followed by the addition of distilled benzylamine (107.2 mg, 1 mmol). The resulting suspension was stirred additional 24 h at 110° C. followed by quenching with saturated ammonium chloride solution. The mixture was extracted with EtOAc, the combined organic phase dried over sodium sulfate and concentrated to dryness. The crude product was purified by flash column chromatography (dichloromethane/methanol) (100:1 to 50:1) to afford the desired product as a yellow solid (25%, 31.2 mg).

Example 25: Synthesis of (S,S)-4-(butylamino)-N-(4-(butylamino)-3,5-diphenyl-4,5-dihydro-3H-4l5-dinaphtho[2,1-d:1',2'-f][1,3,2]diazaphosphepin-4-ylidene)-3,5-diphenyl-4,5-dihydro-3H-4l5-dinaphtho[2,1-d:1',2'-f][1,3,2]diazaphosphepin-4-iminium chloride

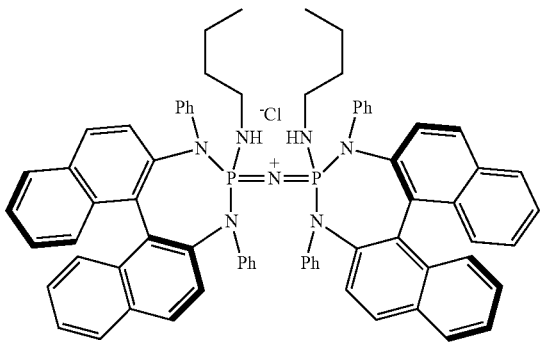

A 10 mL flame dried schlenk was charged with hexachlorobisphosphazonium chloride (162 mg, 0.5 mmol, 1 equiv.), (S)—N2,N2'-diphenyl-[1,1'-binaphthalene]-2,2'-diamine (436.2 mg, 1 mmol, 2 equiv.) followed by the addition of pyridine (1 mL). The brown reaction mixture was stirred additional 24 h at 120° C. followed by the addition of distilled n-Butylamine (365 mg, 5 mmol, 5 equiv.). The resulting suspension was stirred additional 24 h at 110° C. followed by quenching with saturated ammonium chloride solution. The mixture was extracted with EtOAc (3×20 mL), the combined organic phase dried over sodium sulfate and concentrated to dryness. The crude product was purified by flash column chromatography (dichloromethane/methanol) (100:1 to 50:1) to afford the desired product as a yellow solid (45%, 252 mg).

Example 26: Synthesis of (S,S)-3,5-di([1,1':3',1''-terphenyl]-5'-yl)-4-(butylamino)-N-(3,5-di([1,1'1:3', 1''-terphenyl]-5'-yl)-4-(butylamino)-4,5-dihydro-3H-4l5-dinaphtho[2,1-d:1',2'-f][1,3,2]diazaphosphepin-4-ylidene)-4,5-dihydro-3H-4l5-dinaphtho[2,1-d:1',2'-f][1,3,2]diazaphosphepin-4-iminium chloride

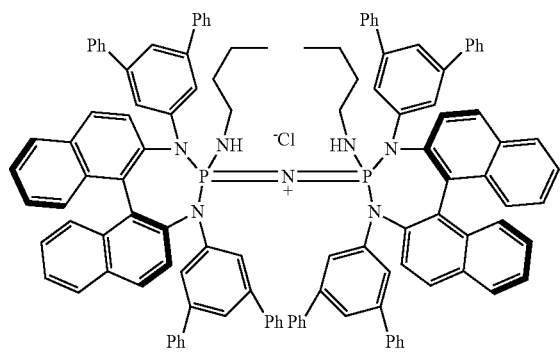

A 10 mL flame dried schlenk was charged with hexachlorobisphosphazonium chloride (81 mg, 0.25 mmol, 1 equiv.), (S)—N2,N2'-di([1,1':3',1''-terphenyl]-5-yl)-[1,1'-binaphthalene]-2,2'-diamine (370 mg, 0.5 mmol, 2 equiv.) followed by the addition of pyridine (0.5 mL). The brown reaction mixture was stirred additional 24 h at 120° C. followed by the addition of distilled n-Butylamine (365 mg, 5 mmol, 10 equiv.). The resulting suspension was stirred additional 24 h at 110° C. followed by quenching with saturated ammonium chloride solution. The mixture was extracted with EtOAc (3×20 mL), the combined organic phase dried over sodium sulfate and concentrated to dryness. The crude product was purified by flash column chromatography (dichloromethane/methanol) (100:1 to 50:1) to afford the desired product as a yellow solid (54%, 233 mg).

Example 27: N,N'-((2s,2's)-azanediylbis(2,6-bis(2,4,6-triethylphenyl)-4l5-dinaphtho[2,1-d:1',2'-f][1,3,2]dioxaphosphepine-4-yl-4-ylidene))bis(1,1,1-trifluoromethanesulfonamide)

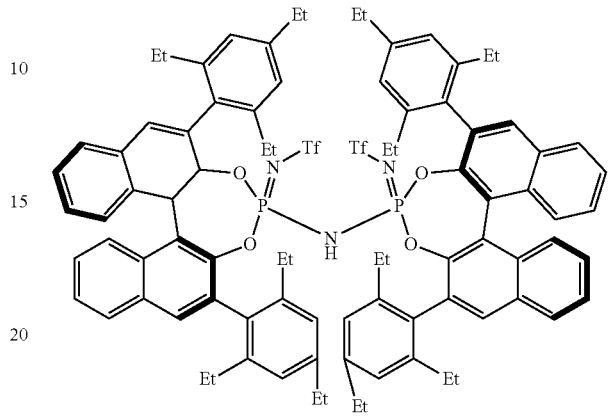

A 10 mL flame-dried schlenk tube was charged with hexachlorobisphosphazonium hexachlorophosphate (45 mg, 0,085 mmol, 1.0 equiv.) and (S)-3,3'-(o,o,p-tri(n-ethyl)phenyl)BINOL (110 mg, 0.18 mmol, 2.2 equiv.) and dissolved in toluene (1 mL). To the solution was added $NEt_3$ (53 µl, 0.38 mmol, 4.5 equiv.) dropwise under vigorous stirring. The resulting yellow suspension was stirred for 60 min at r.t. followed by the addition of $H_2NTf$ (100 mg, 0.68 mmol, 8 equiv.) and $NEt_3$ (195 µl, 137 mg, 1.35 mmol, 16.0 equiv.). The mixture was heated to 80° C. under stirring for 15 h and subsequently 4-DMAP (9.3 mg, mmol, 0.9 equiv.) was added at r.t. The reaction was stirred for 120 h at 120° C. The crude mixture was purified without work-up by FCC (Biotage, gradient: hexanes up to hexanes/EtOAc (5:1)) to elute the desired product as a salt. Acidification was carried out by dissolving the salt in $Et_2O$ (3 mL) and flushing the solution through a 5 cm pad of DOWEX® 50WX8. The organic phase was concentrated to dryness furnish the desired product as a colorless solid (36%, 48 mg)

Example 28: N,N',N'',N'''-(((azanediylbis(2,6-diphenyl-4l5-dinaphtho[2,1-d:1',2'-f][1,3,2]dioxa-phosphepine-4-yl-4-ylidene))bis(azanylylidene))bis(phenyl-l6-sulfanyldiylidene))tetrakis(1,1,1-trifluoromethanesulfonamide)

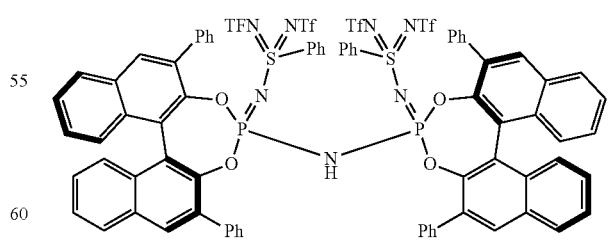

A 25 mL flame dried schlenk flask was charged with hexachlorobisphosphazonium chloride (132 mg, 407 µmol, 1 equiv.) and of N,N'-(amino(phenyl)-l6-sulfanediylidene) bis(1,1,1-trifluoromethane-sulfonamide) from example 18 (343 mg, 818 µmol, 2 equiv.) and suspended in toluene (4 mL). The suspension was stirred for 15 minutes until gas development ceased. Sodium hydride (dispersion in mineral oil, 60%, 218 mg, 5.45 mmol, 13 equiv.) was added and the reaction mixture stirred 3 h at 60° C. (S)-3,3'-(Phenyl) BINOL (401 mg, 914 μmol, 2.2 equiv.) was added and the reaction mixture stirred for 23 h at 100° C. The reaction mixture was then carefully poured into sat. NaHCO$_3$ and the aqueous layer extracted with DCM. The combined organic phases were washed with brine, dried over sodium sulfate and concentrated to dryness followed by purification by FCC (Biotage, gradient DCM up to DCM/MeOH (3:2)) to elute the desired product as a salt. This salt was then acidified by dissolving in a small quantity of DCM and flushing through a 5 cm pad of DOWEX® 50WX8. The organic phase was concentrated to dryness to furnish the desired product in acidic form (60%, 437 mg).

Example 29: N,N'-(azanediylbis(2,6-bis(4-(tert-butyl)phenyl)-4l5-dinaphtho[2,1-d:1',2'-f][1,3,2] dioxaphosphepine-4-yl-4-ylidene))bis(1,1,1-trifluoromethanesulfonamide)

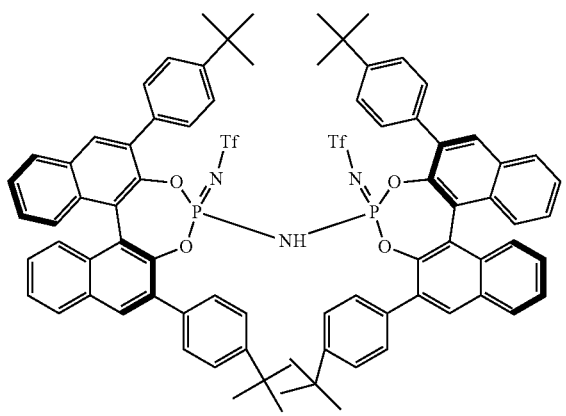

A 10 mL flame dried schlenk flask was charged with hexachlorobisphosphazonium chloride (42 mg, 130 μmol, 1 equiv.), TfNH$_2$ (38.6 mg, 259 μmol, 2 equiv.) and suspended in toluene (1 mL). The suspension was stirred for 1 h at r.t. followed by addition of sodium hydride (dispersion in mineral oil, 60%, 82.9 mg, 2.07 mmol, 16 equiv.) and stirred 6 h at 100° C. followed by addition of (S)-3,3'-(4-tent-butylphenyl)BINOL (173 mg, 314 μmol, 2.4 equiv.) and further stirred for 34 h at 100° C. The reaction mixture was then carefully poured into sat. NaHCO$_3$ and the aqueous layer extracted with DCM. The combined organic phases were washed with brine, dried over sodium sulfate and concentrated to dryness followed by purification by FCC (Biotage, gradient DCM up to DCM/EtOAc(9:1)) to elute the desired product as a salt, which was acidified by dissolving in a small quantity of DCM and flushing through a 5 cm pad of DOWEX® 50WX8. The organic phase was concentrated to dryness to furnish the desired product in acidic form (56%, 107 mg).

Example 30: Synthesis of (S,S)—N-(4-((2,6-bis(2-cyclohexyl-5-methylphenyl)-4-oxidodinaphtho[2,1-d:1',2'-f][1,3,2]dioxaphosphepin-4-yl)amino)-2,6-bis(2-cyclohexyl-5-methylphenyl)-4l5-dinaphtho[2,1-d:1',2'-f][1,3,2]dioxaphosphepin-4-ylidene)-1,1,1-trifluoromethanesulfonamide

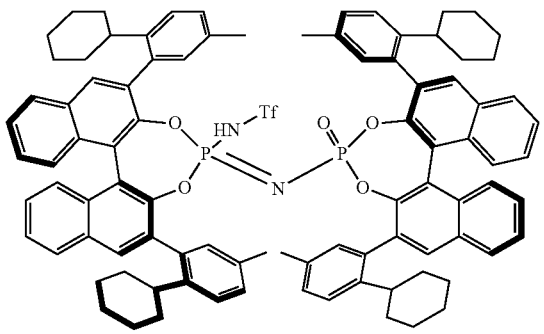

A 25 ml flame dried Schlenk-tube was charged with HCPP (265 mg, 498 μmol, 1 equiv.), 3,3'-bis(2-cyclohexyl-5-methylphenyl)-[1,1'-binaphthalene]-2,2'-diol (628 mg, 996 μmol, 2 equiv.) followed by addition of pyridine (10 ml) to form a yellowish solution. The reaction was stirred 50 min at r.t., followed by addition of TfNH$_2$ (371 mg, 2.49 mmol (5 equiv.) and stirred 1 h at r.t. Water (1 ml, 55.5 mmol, 112 equiv.) was added and the resulting suspension stirred 6 h at r.t. The reaction mixture was poured into ice-cooled HCl$_{(aq)}$ (6 M, 100 ml), transferred to a separation funnel and the aqueous phase extracted with DCM (3×40 ml). The combined organic phase was dried over sodium sulfate, concentrated to dryness and the crude product purified by FCC (DCM/EtOAc 4:1) to elute the desired product as salt. The salt was dissolved in a small quantity of DCM (ca. 4 ml), overlayered with pentane and stand for 3 d in a freezer (~20° C.) to form colorless crystals. The organic phase was decanted and the colorless crystals dissolved in 20 ml DCM followed by addition of HCl (6 M, 20 ml) and stirred for 30 min at r.t. The DCM phase was isolated, concentrated to dryness and further dried in h.v o.n. to afford the desired product in acidic form as a colorless solid (67%, 503 mg, 498 μmol). [NMR analysis shows two sets of signals, which indicate the presence of rotamers (ratio 9:1).

Example 31: Synthesis of 1,1,1-trifluoro-N-((2s)-4-((4-oxido-2,6-bis(2,4,6-tripentylphenyl)dinaphtho[2,1-d:1',2'-f][1,3,2]dioxaphosphepin-4-yl)imino)-2,6-bis(2,4,6-tripentylphenyl)-4l5-dinaphtho[2,1-d:1',2'-f][1,3,2]dioxaphosphepin-4-yl)methanesulfonamide

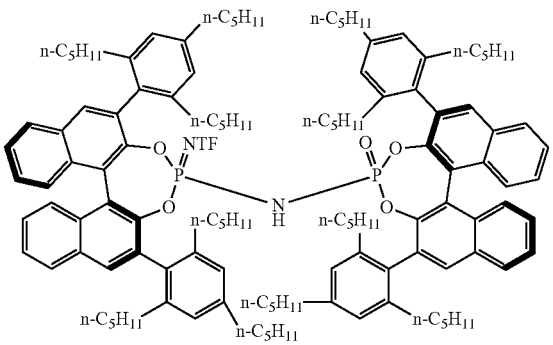

A 10 ml round bottom flask with argon adapter was charged (S)-3,3'-bis(2,4,6-tri-n-pentylphenyl)-BINOL (256 mg, 298 μmol, 2 equiv.), HCPP (82 mg, 154 μmol, 1 equiv.)

followed by subsequent addition of toluene and Net3 (249 µl, 1.79 mmol, 12 equiv.) to form a yellowish suspension which was stirred for 3 h at r.t. TfNH2 (177 mg, 1.19 mmol, 8 equiv.) was added and the reaction stirred for 23 h at r.t. followed by addition of H$_2$O (268 µl, 14.9 mmol, 100 equiv.), pyridine (1 ml, to increase the solubility and facilitate the hydrolysis) and stirred 3 h at 70° C. The reaction mixture was poured into aqueous HCl (6 M) and extracted with DCM. The combined organic DCM phase was concentrated to dryness and purified by FCC (Biotage, gradient: hexanes/DCM 100:0 up to 0:100; product elution with 60:40) to furnish the desired product as salt, which was acidified by dissolving in DCM (3 ml) and emulsion in HCl (6M, 3 ml). The emulsion was stirred for 30 min, the organic phase isolated, concentrated to dryness and dried o.n. in h.v. to afford the desired product in acidic form (79%, 231 mg, 149 µmol).

Example 32: Synthesis of (S,S)—N,N'-(azanediyl-bis(2,6-bis(2'-(tert-butyl)spiro[cyclopentane-1,9'-fluoren]-7'-yl)-4l5-dinaphtho[2,1-d:1',2'-f][1,3,2]dioxaphosphepine-4-yl-4-ylidene))bis(1,1,1-trifluoromethanesulfonamide)

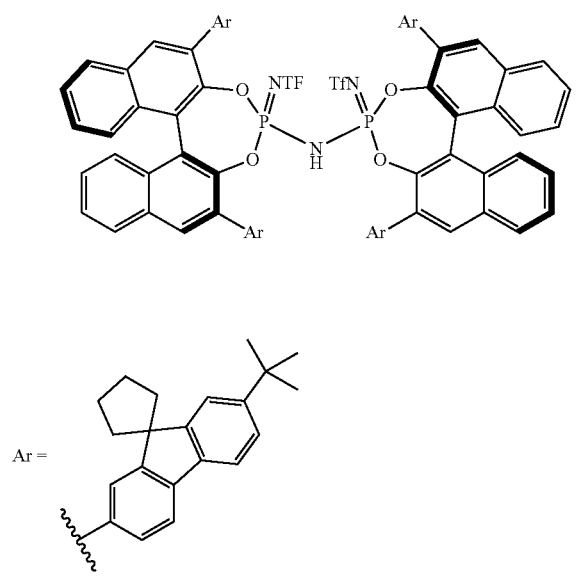

10 ml flame-dried and argonated Schlenk tube was charged with HCPP (30 mg, 56 µmol, 1.0 equiv.) and (S)-3,3'-bis(2'-(tert-butyl)spiro[cyclopentane-1,9'-fluoren]-7'-yl)-BINOL (64 mg, 116 µmol, 2.05 equiv.) and dissolved in 0.8 ml toluene. To the solution was added NEt$_3$ (35 µl, 254 µmol, 4.5 equiv.) dropwise under vigorous stirring. The resulting yellow suspension was stirred for 60 min at r.t. followed by the addition of H$_2$NTf (327 mg, 2.19 mmol, 8 equiv.). The mixture was heated to 120° C. under stirring for 36 h. The crude mixture was purified without work-up by FCC (gradient: hexanes/EtOAc 1:0 to 9:1) to elute the desired product as a salt. Acidification was carried out by dissolving the salt in Et$_2$O (3 ml) and flushing the solution through a 5 cm pad of DOWEX® 50WX2. The organic phase was concentrated to dryness to furnish the desired product as a colorless solid (70%, 392 mg)

Example 33: Synthesis of N,N',N'',N'''-(((azanediyl-bis(2,6-diphenyl-4l5-dinaphtho[2,1-d:1',2'-f][1,3,2]dioxaphosphepine-4-yl-4-ylidene))bis(azanylylidene))bis(phenyl-l6-sulfanyldiylidene))tetrakis(1,1,1-trifluoromethanesulfonamide)

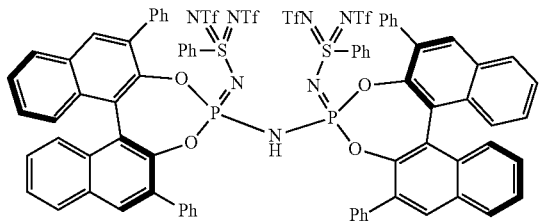

A 25 ml flame dried and argonated schlenk flask was charged with hexachlorobisphosphazonium chloride (132 mg, 407 µmol, 1 equiv.) and of N,N'-(amino(phenyl)-l6-sulfanediylidene)bis(1,1,1-trifluoromethane-sulfonamide) from example 18 (343 mg, 818 µmol, 2 equiv.) and suspended in toluene (4 ml). The suspension was stirred for 15 minutes until gas development ceased. Sodium hydride (dispersion in mineral oil, 60%, 218 mg, 5.45 mmol, 13 equiv.) was added and the reaction mixture stirred 3 h at 60° C. (S)-3,3'-(Phenyl)BINOL (401 mg, 914 µmol, 2.2 equiv.) was added and the reaction mixture stirred for 23 h at 100° C. The reaction mixture was then carefully poured into sat. NaHCO$_3$ and the aqueous layer extracted with DCM. The combined organic phases were washed with brine, dried over sodium sulfate and concentrated to dryness followed by purification by FCC (Biotage, gradient DCM up to DCM/MeOH (3:2)) to elute the desired product as a salt. This salt was then acidified by dissolving in a small quantity of DCM and flushing through a 5 cm pad of DOWEX® 50WX8. The organic phase was concentrated to dryness to furnish the desired product in acidic form (60%, 437 mg).

Example 34: Synthesis of N,N',N'',N'''-(((azanediyl-bis(2,6-bis(3,5-bis(trifluoromethyl)phenyl)-4l5-dinaphtho[2,1-d:1',2'-f][1,3,2]dioxaphosphepine-4-yl-4-ylidene))bis(azanylylidene))bis(phenyl-l6-sulfanyldiylidene))tetrakis(1,1,1-trifluoromethanesulfonamide)

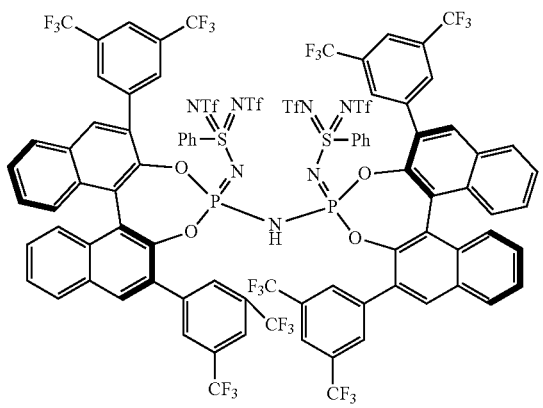

A 10 ml schlenk-tube was charged with HCPC (73.0 mg, 0.23 mmol), phenylbis(trifluoromethylsulfonylimino)

sulfon-amide (191 mg, 0.46 mmol, 2 equiv.) and suspended in 2 ml toluene. The reaction was stirred 30 min at r.t. (150 rpm) until the gas development ceased. Sodium hydride (dispersion in mineral oil, 60%; 116 mg, 2.90 mmol, 13 equiv.) was added and the resulting suspension stirred for 2 h in a pre-heated metal block to 110° C. (S,S)-3,3'-(m,m-bistrifluoromethylphenyl)BINOL was added in one portion and the sealed schlenk-flask and 44 h stirred at 110° C. The reaction mixture was cooled to r.t., diluted with DCM and poured into sat. NaHCO3(aq). The aqueous phase was extracted with DCM (4×20 ml), the combined organic phase dried over sodium sulfate and concentrated to dryness. Flash column purification (Biotage gradient; DCM/MeOH up to 4/1) yields the desired product as a salt, which was acidified by dissolving the product in a small quantitiy of DCM and passing through pre-activated Dowex40WX8 to afford the desired product in acidic form (81%, 426 mg, 0.18 mmol).

CONCLUSION

In summary, the inventors have developed a new methodology, allowing a rapid and highly efficient single-flask synthesis of a broad range of dimeric phosphazene derived catalysts utilizing hexachlorobisphosphazonium salts as a building block. Novel IDPs, iIDPs and IDPis with unique structural confinement are accessible in a straightforward and operationally simple synthesis and can be used for asymmetric catalysis With a new access of novel and unexplored dimeric phosphazene catalysts with unique structurally confined cavities, the inventors started to focus their attention to small substrates, specifically those, which so far remained elusive to stereoselectively control in asymmetric catalysis. Propyl methyl sulfide, a substrate, which contains two structurally very similar groups, has so far, not been catalytically oxidized with excellent enantioselectivities.

Surprisingly, the new accessibility of new extremely confined IDP's resulted in a rapid identification of IDP from Example 9 for the asymmetric sulfoxidation (J. Am. Chem. Soc. 2012, 134, 10765) of this particular challenging substrate with an enantiomeric ratio of 95:5. Excellent enantioselectivities of propyl methyl sulfoxide illustrate the importance and impact of this new catalyst synthesis methodology to design new, previously not accessible catalysts with high confinement, solving tremendous challenges in asymmetric catalysis. The utility of those new catalysts are currently being investigated in our laboratory.

The inventors anticipate, that the utilization of hexachlorobisphosphazonium salts and derivatives thereof as a building block towards the synthesis of imidodiphosphoryl compounds might find future application towards the synthesis of novel, structurally distinct catalyst motifs, which might find application in the field of Brønsted acid and Brønsted base as well as Lewis acid and Lewis base catalysis.

The invention claimed is:

1. Process for preparing a chiral imidodiphosphoryl compound of formula (I) or a tautomeric or ionic form thereof:

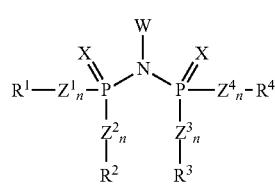
(I)

wherein in formula (I):
X is the same or different on each P and represents O, S, Se, $CR^C_2$ or $NR^C$,
$Z^1$ to $Z^4$ are, independently from each other, the same or different and each represents O, S, Se or $NR^C$,
each n is, independently from each other, the same or different and stands for 0 or 1,
W is selected from hydrogen, halogen, a metal selected from Li, Na, K, Rb, Cs, Be, Mg, Ca, Sr, Ba Sc, Ti, V, Cr, Mn, Fe, Co, Ni, Cu, Zn, Y, Zr, Mo, Ru, Rh, Pd, Ag, Cd, W, Re, Os, Ir, Pt, Au, Hg, Al, Ga, In, Ge, Sn, Pb, As, Sb, Bi, Se, Te, La, Sm, Eu, Yb, U or a cationic organic group, a substituted borane-$BR^IR^{II}R^{III}$ or a substituted silicon-$SiR^IR^{II}R^{III}$, wherein $R^I$, $R^{II}$ and $R^{III}$ may be same or different and each stands for hydrogen, halogen, an optionally —O— bonded $C_1$ to $C_{20}$ straight chain, branched chain or cyclic aliphatic hydrocarbon, optionally having one or more unsaturated bonds or one or more hetero atoms in the chain, a $C_5$ to $C_{18}$ heteroaromatic hydrocarbon, a $C_6$ to $C_{18}$ aromatic hydrocarbon or partially arene-hydrogenated forms thereof, each hydrocarbon optionally being substituted by one or more groups selected from $C_1$ to $C_{20}$ straight chain, branched chain or cyclic aliphatic hydrocarbons, or one or more heterosubstituents,
$R^1$, $R^2$, $R^3$ and $R^4$ are, independently from each other, the same or different and each represents an aliphatic hydrocarbon group, heteroaliphatic hydrocarbon group, aromatic hydrocarbon group, heteroaromatic hydrocarbon group, and, for n=O, F, Cl, Br, I, CN, OTf, OMs, OTs, or any other pseudohalogenide with leaving group properties,
whereby $R^1$ may form a bond with any one of $R^2$, $R^3$ or $R^4$ and the other two of $R^2$, $R^3$ or $R^4$ may form a bond with each other, or whereby any of $R^1$, $R^2$, $R^3$, $R^4$, $X^1$ and $X^2$ may form a bond with each other, when $R^1$, $R^2$, $R^3$ and $R^4$ each represent an aliphatic hydrocarbon group, heteroaliphatic hydrocarbon group, aromatic hydrocarbon group, heteroaromatic hydrocarbon group;
$R^C$ represents, independently from each other, an aliphatic hydrocarbon group, heteroaliphatic hydrocarbon group, aromatic hydrocarbon group, an heteroaromatic hydrocarbon group, or $R^N$;
with the proviso that at least one of $R^1$, $R^2$, $R^3$, $R^4$ or $R^C$ represents a hydrocarbon group as defined before, each hydrocarbon group optionally being further substituted by one or more heterosubstituents, aliphatic hydrocarbon group, heteroaliphatic hydrocarbon group, aromatic hydrocarbon group or heteroaromatic hydrocarbon group,
$R^N$ is an electron withdrawing or electron donating group, being the same or different on each position and being selected from:
i. -alkyl, —CO-alkyl, —(CO)—O-alkyl, sulfinyl alkyl, sulfonyl alkyl, sulfonyl iminoalkyl, sulfonyl bisiminoalkyl, phosphinyl dialkyl, phosphonyl alkyl, alkyl phosphorane, N,N'-alkylimidazolidin-2-iminyl wherein alkyl is a $C_1$ to $C_{20}$ straight chain, branched chain or cyclic aliphatic hydrocarbon, optionally having at least one substituent selected from halogen, cyano, nitro, imino =NH, substituted imino =$NR^C$, amino —$NH_2$, or substituted amino —$NHR^C$, —$NR^C_2$ wherein $R^C$ represents, independently from each other, an aliphatic hydrocarbon group, a heteroaliphatic hydrocarbon group, an aromatic hydrocarbon group or an heteroaromatic hydrocarbon group;

ii. -aryl, —CO-aryl, —(CO)—O-aryl, sulfinyl aryl, sulfonyl aryl, sulfonyl iminoaryl, sulfonyl iminosulfonylaryl, sulfonyl bisiminoaryl, phosphinyl diaryl, phosphinyl alkylaryl, phosphonyl aryl, aryl phosphoranes, aryl alkyl phosphoranes, N,N'-arylimidazolidin-2-iminyl, N-aryl-N'-alkylimidazolidin-2-iminyl wherein aryl is a $C_6$ to $C_{18}$ aromatic hydrocarbon, optionally having at least one substituent selected from halogen, a $C_1$ to $C_6$ aliphatic hydrocarbon, optionally having at least one substituent selected from halogen, cyano, nitro, imino =NH, substituted imino =$NR^C$, amino —$NH_2$ or substituted amino —$NHR^C$, —$NR^C_2$ wherein $R^C$ represents, independently from each other, an aliphatic hydrocarbon group, a heteroaliphatic hydrocarbon group, an aromatic hydrocarbon group, or an heteroaromatic hydrocarbon group;

iii. -heteroaryl, —CO-heteroaryl, —(CO)—O-heteroaryl, sulfinyl heteroaryl, sulfonyl heteroaryl, —(P=O)-diheteroaryl, phosphinyl diheteroaryl, phosphinyl arylheteroaryl, phosphinyl heteroaryl alkyl, phosphonyl heteroaryl, heteroaryl phosphoranes, heteroaryl aryl phosphoranes, heteroaryl aryl alkyl phosphoranes, N,N'-heteroarylimidazolidin-2-iminyl, N-heteroaryl-N'-alkylimidazolidin-2-iminyl, N-heteroaryl-N'-arylimidazolidin-2-iminyl wherein heteroaryl is a $C_2$ to $C_{18}$ heteroaromatic hydrocarbon, optionally having at least one substituent selected from halogen, a $C_1$ to $C_6$ aliphatic hydrocarbon, optionally having at least one substituent selected from halogen, cyano, nitro, imino =NH, substituted imino =$NR^C$, amino-$NH_2$, or substituted amino-$NHR^C$, $NR^C_2$ wherein $R^C$ represents, independently from each other, an aliphatic hydrocarbon group, a heteroaliphatic hydrocarbon group, an aromatic hydrocarbon group, or an heteroaromatic hydrocarbon group;

whereby for those groups of i.), ii.) and iii.) having at least one C=O, S=O or P=O moiety, =O may be replaced by an imino group =N—R', and/or for those groups of i.), ii.) and iii.), having at least one C—OR, S—OR or P—OR moiety, —OR may be replaced by an amino group-NR'R", wherein R' and R", independently from each other, represent an aliphatic hydrocarbon group, a heteroaliphatic hydrocarbon group, an aromatic hydrocarbon group, or an heteroaromatic hydrocarbon group, said process comprising the steps of reacting, in at least one reaction step, a bisphosphazene compound of formula (II):

$$Q_3P=N^+=PQ_3 A^- \quad (II)$$

wherein in formula (II):
each Q is, independently from each other, the same or different, and represents F, Cl, Br, I, CN, OTf, OMs, OTs, or any other pseudohalogenide with leaving group properties, and
wherein $A^-$ represents a halogenide or weakly coordinating anion, with one to six nucleophilic groups being present on one to six, optionally chiral, compounds:
wherein one or two nucleophilic groups $X^W$ which can be the same or different from each other and which are present on one to two optionally chiral bivalent compounds of formula (III) $X^W W_2$, wherein $X^W$ has the meaning of any of O, S, Se, $CR^C_2$, or $NR^C$, wherein $R^C$ and W have the meanings as defined above, wherein up to four nucleophilic groups $Z^W$, which can be the same or different from each other, are present on one to four optionally chiral monovalent compounds of formula (IV) $R^C Z^W_n W$, wherein $R^C$ has the meaning as defined above, $Z^W$ is the same or different on each compound and has the meaning of any of $Z^1$ to $Z^4$; and W and n have the meanings as defined above, wherein at least one nucleophilic group $X^W$ being present on one to two optionally chiral bivalent compounds of formula (III) $X^W W_2$, wherein $X^W$ has the meaning of any of $CR^C_2$ or $NR^C$; wherein $R^C$ has the meaning as defined above, or at least one nucleophilic groups $Z^W$ being present on one to four optionally chiral monovalent compounds of formula (IV) $R^C Z^W_n W$, wherein $R^C$ has the meaning as defined above; $Z^W$, W and n have the meaning as defined above, is reacted with the compound of formula (II),
with the proviso that, in formula (I), at least one of $R^1$ to $R^4$ is chiral, or at least two of $R^1$ to $R^4$ form a chiral group, or at least one P or at least one S is chiral.

2. Process for preparing a chiral imidodiphosphoryl compound of formula (I) as claimed in claim 1, wherein in a first reaction step, one nucleophilic group $X^W$ which has the meaning of X as defined in claim 1, and which is present on one optionally chiral compound of formula (III) $X^W W_2$ or two nucleophilic groups $X^W$ which have the meaning of X as defined in claim 1, and which are present on one or on two optionally chiral compounds of formula (III) $X^W W_2$, respectively, are reacted with a bisphosphazene compound of formula (II), and, in a second step, the reaction product obtained in the first reaction step is optionally reacted
with a quencher for removing any remaining Q group, or
with up to four nucleophilic groups $Z^W$ which can be the same or different from each other and which are present on one to four optionally chiral compounds of formula (IV) $R^C Z^W_n W$, wherein $R^C$ has the meaning as defined in claim 1, $Z^W$ is the same or different and has the meaning of any of $Z^1$ to $Z^4$, W has the meaning as defined in claim 1 and n is 0 or 1, are reacted with the reaction product of the first step, whereby the reaction product obtained in the second step is optionally reacted with a quencher for removing any remaining Q group,
wherein $Z^1$ to $Z^4$, and Q have the meanings as defined in claim 1.

3. Process for preparing a chiral imidodiphosphoryl compound of formula (I) as claimed in claim 1, wherein in a first reaction step, one to four nucleophilic groups $Z^W$, which can be the same or different from each other and which are present on one to four optionally chiral compounds of the formula (IV) $R^C Z^W_n W$, wherein $R^C$ has the meaning as defined in claim 1, $Z^W$ is the same or different and has the meaning of any of $Z^1$ to $Z^4$, W has the meaning as defined in claim 1 and n is 0 or 1, are reacted with the bisphosphazene compound of the general formula (II), and, optionally in a second step, one nucleophilic group $X^W$ which has the meaning of X as defined in claim 1 and which is present on one optionally chiral compound of formula (III) $X^W W_2$ or two nucleophilic groups $X^W$ which have the meaning of X as defined in claim 1, and which are present on one or two optionally chiral compounds of formula (III) $X^W W_2$, respectively, are reacted with the reaction product of the first reaction step, and, when in the second step, one nucleophilic group $X^W$ present on one optionally chiral compound of formula (III) $X^W W_2$ is reacted with the reaction product obtained in the first step, the reaction product obtained in the second step is optionally reacted with a quencher for removing the remaining Q group, wherein $Z^1$ to $Z^4$ and Q have the meanings as defined in claim 1.

4. Process for preparing a chiral imidodiphosphoryl compound of formula (I) as claimed in claim 1, wherein in a first reaction step, four nucleophilic groups $Z^W$, which can be the same or different from each other and which are present on two to four optionally chiral compounds of formula (IV) $R^C Z^W{}_n W$, wherein $R^C$ has the meaning as defined in claim 1, $Z^W$ is the same or different and has the meaning of any of $Z^1$ to $Z^4$, W has the meaning as defined in claim 1 and n is 0 or 1, are reacted with the bisphosphazene compound of formula (II), and, in a second reaction step, the reaction product obtained in the first step is optionally reacted with a quencher for removing the remaining Q groups, wherein $Z^1$ to $Z^4$ and Q have the meanings as defined in claim 1.

5. Process for preparing a chiral imidodiphosphoryl compound of formula (I) as claimed in claim 1, wherein two nucleophilic groups $X^W$ on the compound of formula (III) $X^W W_2$, wherein W has the meaning as defined in claim 1, which are $CR^C{}_2$ or $NR^C$ and four nucleophilic groups $Z^W$ on the compound of formula (IV) $R^C Z^W{}_n W$, wherein $R^C$ has the meaning as defined in claim 1, $Z^W$ is the same or different and has the meaning of any of $Z^1$ to $Z^4$, W has the meaning as defined in claim 1 and n is 0 or 1, are present on one optionally chiral compound and are stepwise reacted with the bisphosphazene compound of formula (II), wherein $Z^1$ to $Z^4$ and Q have the meanings as defined in claim 1.

6. Process for preparing a chiral imidodiphosphoryl compound of formula (I) as claimed in claim 1, wherein four nucleophilic groups $Z^W$, which can be the same or different from each other and which are present on two optionally chiral compounds of formula (IV) $R^C Z^W{}_n W$, wherein $R^C$ has the meaning as defined in claim 1, $Z^W$ is the same or different and has the meaning of any of $Z^1$ to $Z^4$, W has the meaning as defined in claim 1 and n is 0 or 1, are reacted with the bisphosphazene compound of formula (II), $$Q_3 P = N^+ = P Q_3 A^- \quad (II)$$

wherein in formula (II):
each Q is, independently from each other, the same or different, and represents F, Cl, Br, I, CN, OTf, OMs, OTs, or any other pseudohalogenide with leaving group properties, and
wherein A represents a halogenide or weakly coordinating anion,
wherein said two optionally chiral compounds of formula (IV) $R^C Z^W{}_n W$, which may be the same or different, are each represented by a structural unit of formula (V):

(V)

wherein $Z^1$, $Z^2$, $Z^3$, $Z^4$, $R^1$, $R^2$, $R^3$, and $R^4$ have the meanings as defined in claim 1.

7. Process for preparing a chiral imidodiphosphoryl compound of formula (I) as claimed in claim 6, wherein said structural unit of formula (V) is the same or different and is represented by BINOL, VANOL, VAPOL, TADDOL, SPINOL, or comprises, as $Z^{1,3}-R^{1,3}-R^{2,4}-Z^{2,4}$, 1,1'binaphthyl, 8H-1,1-binaphthyl, biphenyl, 3,3'-(diphenyl)-2,2'-binaphthyl, biphenyl, 2,2'-diphenyl-3,3'-biphenanthrenyl, 1,1'-bianthracenyl, 1,1'-biphenanthryl or partially arene-hydrogenated forms thereof, 2,2-dimethyl-1,3-dioxolanyl, a $C_2$ to alkyl $C_{18}$ chain, spirobiindanyl, tetrahydrospirobinaphthalenyl, paracyclophanyl, metallocenyl, wherein W is H,
wherein each of the compounds before is optionally substituted by one or more substituents which may be same or different on each position and which is each selected from hydrogen, a heterosubstituent, a $C_1$ to $C_{20}$ aliphatic hydrocarbon, optionally having one or more unsaturated bonds, a $C_6$ to $C_{18}$ aromatic hydrocarbon or a $C_5$ to $C_{18}$ heteroaromatic hydrocarbon which hydrocarbons may be substituted by one or more heterosubstituents.

8. Process for preparing a chiral imidodiphosphoryl compound of formula (I) as claimed in claim 1, wherein said one or two optionally chiral compounds of formula (III) $X^W W_2$, which may be the same or different, are represented by $R^N - NH_2$, wherein $R^N$ has the meaning as defined in claim 1.

9. Process for preparing a chiral imidodiphosphoryl compound of formula (I) as claimed in claim 7, wherein said structural unit of formula (V) is the same or different and is represented by formula (VI), the partially arene-hydrogenated forms thereof or by formula (VII):

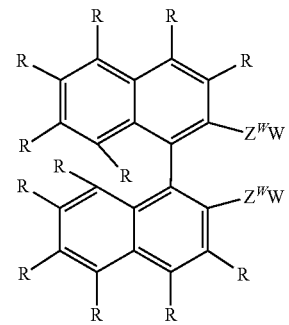

(VI)

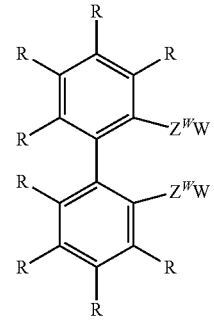

(VII)

wherein in said formulae (VI) and (VII), the substituent R may be same or different on each position and is each selected from hydrogen, a heterosubstituent, a $C_1$ to $C_{20}$ aliphatic hydrocarbon, optionally having one or more unsaturated bonds, a $C_6$ to $C_{18}$ aromatic hydrocarbon or a $C_5$ to $C_{18}$ heteroaromatic hydrocarbon which hydrocarbons may be substituted by one or more heterosubstituents, and two of which substituents R may form an aliphatic or aromatic ring system with each other and wherein $Z^W$ and W are as defined in claim 1.

10. A process comprising:
(a) preparing a chiral imidodiphosphoryl compound of formula (I) or a tautomeric or ionic form thereof according to a process as claimed in claim 1; and
(b) conducting a Brønsted acid/Brønsted base or Lewis acid/Lewis base mediated transformation in the presence of a catalyst, wherein the catalyst is the chiral imidodiphosphoryl compound of formula (I) or a tautomeric or ionic form prepared in (a).

* * * * *